United States Patent
Shehata et al.

(10) Patent No.: US 11,929,021 B1
(45) Date of Patent: Mar. 12, 2024

(54) OPTICAL CROSSTALK COMPENSATION FOR FOVEATED DISPLAY

(71) Applicant: Apple Inc., Cupertino, CA (US)

(72) Inventors: Shereef Shehata, San Ramon, CA (US); Jim C Chou, San Jose, CA (US); Sheng Zhang, San Jose, CA (US); Shengchang Cai, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/328,617

(22) Filed: Jun. 2, 2023

(51) Int. Cl.
G09G 3/3208 (2016.01)
G06F 3/01 (2006.01)

(52) U.S. Cl.
CPC ........... G09G 3/3208 (2013.01); G06F 3/013 (2013.01); G09G 2320/0214 (2013.01)

(58) Field of Classification Search
CPC ................. G06F 3/013; G09G 3/3208; G09G 2320/0214
See application file for complete search history.

(56) References Cited

U.S. PATENT DOCUMENTS

| | | | |
|---|---|---|---|
| 9,083,948 | B2 | 7/2015 | Dane et al. |
| 9,412,335 | B2 | 8/2016 | Wang et al. |
| 9,749,547 | B2 | 8/2017 | Venkataraman et al. |
| 11,294,034 | B2 | 4/2022 | Kriebernegg et al. |
| 2009/0079680 | A1 | 3/2009 | Yagiura |
| 2011/0031418 | A1 | 2/2011 | Shcherback et al. |
| 2021/0098520 | A1 | 4/2021 | Cai et al. |
| 2021/0098535 | A1 | 4/2021 | Cai et al. |

OTHER PUBLICATIONS

S. Lee et al., "Foveated near-eye display for mixed reality using liquid crystal photonics," Scientific Reports, vol. 10, No. 16127, published Sep. 30, 2020, https://doi.org/10.1038/s41598-020-72555-w.
"Foveated imaging," Wikipedia, last edited Mar. 20, 2020, accessed via https://en.wikipedia.org/wiki/Foveated_imaging on May 15, 2023.
"Head-mounted display," Wikipedia, last edited Apr. 21, 2023, accessed via https://en.wikipedia.org/wiki/Head-mounted_display on May 15, 2023.

*Primary Examiner* — Michael Pervan
(74) *Attorney, Agent, or Firm* — Fletcher Yoder, P.C.

(57) ABSTRACT

Systems and methods are provided for using an optical crosstalk compensation (OXTC) block to compensate for optical crosstalk resulted from a combination of viewing angle change across field of view (FoV), color filter (CF) crosstalk, and the OLED various angle color shift (VACS) of a foveated electronic display. One or more two-dimensional (2D) OXTC factor maps are used to determine OXTC factors for input image data of the OXTC block, and the OXTC factors are updated on a per frame basis. Offset values are determined using a parallel architecture and used to determine the OXTC factors. Compensation weights are used to determine weighted OXTC factors to improve processing efficiency. Output image data are obtained by applying the weighted OXTC factors to the input image data.

20 Claims, 14 Drawing Sheets

OPTICAL CROSSTALK COMPENSATION FOR FOVEATED DISPLAY

BACKGROUND

The present disclosure relates generally to image processing and, more particularly, to optical crosstalk compensation for a foveated electronic display.

Electronic displays are found in numerous electronic devices, such as mobile phones, computers, televisions, automobile dashboards, and augmented reality or virtual reality or mixed reality headsets or glasses, to name just a few. Electronic displays control the amount of light emitted from their display pixels based on corresponding image data to produce images. Processing circuitry of the electronic device may generate or retrieve the image data that may be used to program the display pixels of the electronic display to display an image. In some scenarios, the image to be displayed may appear distorted when perceived by a viewer due to environmental effects, properties of the display, the viewer's point-of-view (POV), image processing alterations such as shifts and scaling, and/or other distorting factors. For example, optical crosstalk may be induced by color filter crosstalk and/or organic light-emitting diode (OLED) off-angle color shift.

SUMMARY

This disclosure provides systems and methods for using an optical crosstalk compensation (OXTC) block to process image data to compensate for the optical crosstalk before the image data being displayed. The optical crosstalk may be a result of combination of viewing angle change across field of view (FoV), color filter (CF) crosstalk, and the OLED various angle color shift (VACS) of an electronic display. To mitigate the color artifacts that may appear due to optical crosstalk, a two-dimensional (2D) compensation map may be used, where each point on the map may be associated with a transform (e.g., a 3×3 transform) that is used to compensate for the optical crosstalk of the electronic display. The transform is used to compensate for the intra-pixel optical crosstalk between the red, green, and blue sub-pixels on the electronic display. The optical crosstalk at any given location on the electronic display panel changes dynamically and is related to the viewing angle of a viewer, and the compensation may be determined based on the center of the gaze location on a per frame basis.

The image processing circuitry of the electronic device may include an OXTC block. The OXTC block may apply spatial resampling to image data using the 2D compensation map. When the grid points in the 2D compensation map are less than the number of pixels to be displayed, an interpolation may be performed on the 2D compensation map to obtain compensation values for every pixel. Furthermore, to perform correct interpolation for a foveated display, the different regions that are relative to the central viewing region may be handled to account for their positions so as not to introduce distortion at region boundaries on the display panel. Moreover, the OXTC block may calculate optical crosstalk weighted compensation for display pixels based on distances of the display pixels relative to the gaze location. The compensated image data may be output for display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
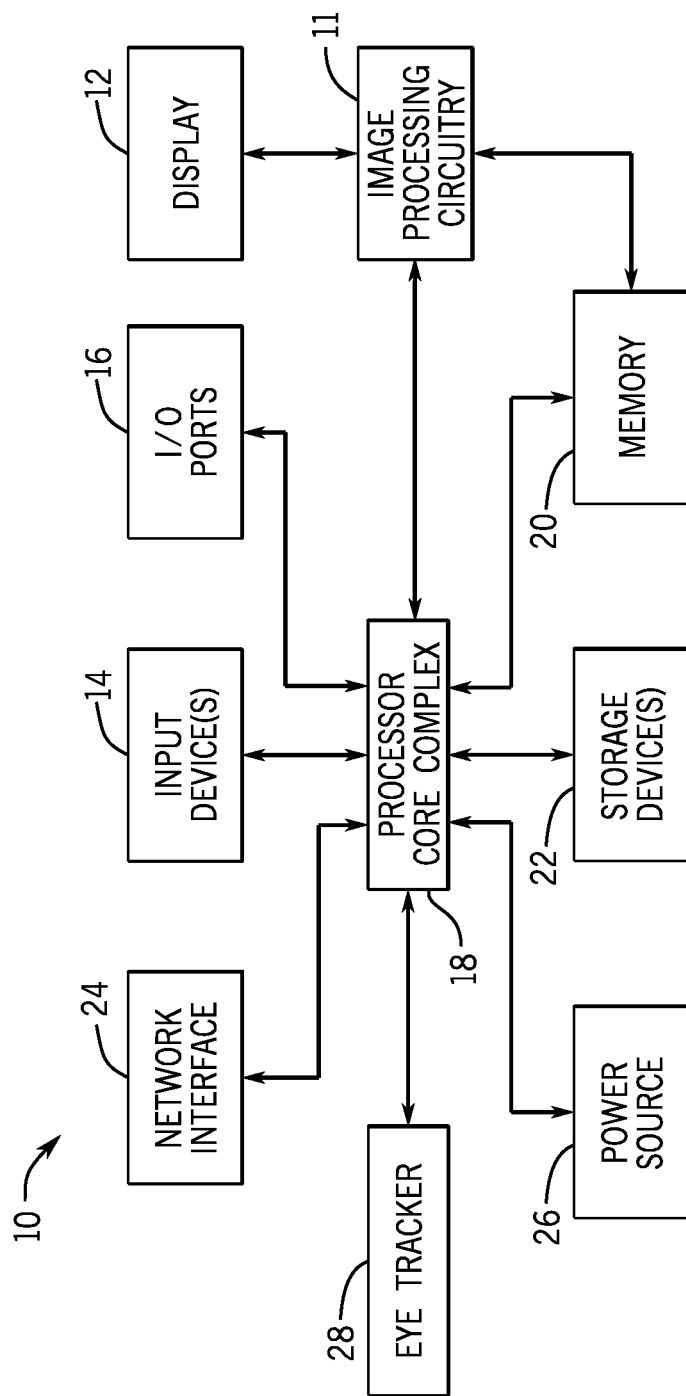
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use one or more electronic displays to present visual information such as text, still images, and/or video by displaying one or more images. To display an image, an electronic display may control light emission of its display pixels based at least in part on corresponding image data. The image data may be processed to account for distortions due to different display scenarios and/or input image characteristics before the image data being displayed. In any case, an electronic display may generally display image content by actively controlling light emission from display pixels, which each includes one or more color component sub-pixels, implemented on its display panel based on corresponding image data, which is indicative of target characteristics (e.g., color and/or magnitude) of light emission therefrom.

For example, a display pixel in an electronic display may include one or more red sub-pixels that control magnitude of red light emission from the display pixel, one or more blue sub-pixels that control magnitude of blue light emission from the display pixel, one or more green sub-pixels that control magnitude of green light emission from the display pixel, one or more white sub-pixels that control magnitude of white light emission from the display pixel, or any combination thereof. Additionally, an image pixel (e.g., image data corresponding with point in image content) corresponding with the display pixel may include red component image data (e.g., red grayscale level) indicative of target red light emission from the display pixel, blue component image data (e.g., blue grayscale level) indicative of target blue light emission from the display pixel, green component image data (e.g., green grayscale level) indicative of target green light emission from the display pixel, white component image data (e.g., white grayscale level) indicative of target white light emission from the display pixel, or any combination thereof. In other words, to display image content at the display pixel, the electronic display may actively control magnitude of light emission from the one or more red sub-pixels of the display pixel based on the red component image data, the magnitude of light emission from the one or more green sub-pixels of the display pixel based on the green component image data, and so on.

To produce light of a target color, at least in some instances, each color component sub-pixel implemented on a display panel may include a color filter cell of an appropriate target color that is disposed between a light-emissive element (e.g., OLED) and an outward-facing viewing surface of the display panel. For example, a red sub-pixel may include a red color filter cell disposed over a red organic light-emitting diode, a green sub-pixel may include a green color filter cell disposed over a green organic light-emitting diode, a blue sub-pixel may include a blue color filter cell disposed over a blue organic light-emitting diode, a white sub-pixel may include a white color filter cell disposed over a white organic light-emitting diode, or any combination thereof. Additionally, at least in some instances, an encapsulation layer, such as thin film encapsulation (TFE) layer, may be formed over the light-emissive elements, for example, to separate one or more light-emissive elements (e.g., OLEDs) from the color filter layer. Thus, at least in such instances, a light ray emitted from a light-emissive element of a color component sub-pixel may pass through the encapsulation layer and the color filter layer before exiting the outward-facing viewing surface of the display panel.

Generally, light emitted from a light source, such as an organic light-emitting diode of a color component sub-pixel, radiates outwardly from the light source, for example, in a conical shape. As such, magnitude of light emission is generally strongest along a normal axis of the light source and weakens the farther the emission angle deviates from the normal axis. Accordingly, color filter cells are often implemented such that their footprints (e.g., width, length, and/or pitch) are centered on the normal axes of corresponding light-emissive elements, for example, to maximize perceived brightness resulting from actual light emission of the light-emissive elements when the display panel is viewed by a user's (e.g., human's) eye with a viewing angle of zero (e.g., pupil oriented perpendicular to display panel and/or along normal axis of display panel).

A human's eye generally perceives visible light due to interaction of cones (e.g., photoreceptor cells) in its retina with corresponding light rays. However, a human's eye generally has a limited field of view (FOV), which is centered on its viewing (e.g., gaze or pupil) angle. Due to its limited field of view, at least in some instances, a human's eye may perceive a first portion of light emitted from a display pixel, but not a second portion of the light emitted from the display pixel, for example, due to light rays in the second portion of the emitted light not actually reaching the eye's retina and, thus, being outside its field of view. In other words, luminance perceived by a human's eye may generally be dependent on its field of view.

However, the field of view of a human's eye may generally vary with its viewing characteristics, such as viewing (e.g., gaze or pupil) angle, viewing location (e.g., pupil offset from center and/or pupil relief), and/or viewing aperture (e.g., pupil or eye box) size. For example, orientation (e.g., direction) of the field of view of a human's eye may be dependent on its viewing (e.g., gaze or pupil) angle and, thus, a change in its viewing angle (e.g., due to eye rotation) may change orientation of its field of view. Additionally or alternatively, size (e.g., span) of the field of view of a human's eye may be dependent on its pupil (e.g., viewing aperture or eye box) size and, thus, a change in its pupil size may change the size of its field of view.

Moreover, the sensitivity of a human's eye to visible light generally varies across its field of view. In particular, a central portion (e.g., fovea) of an eye's retina is generally more sensitive to visible light compared to a peripheral (e.g., outer) portion of the eye's retina, for example, due to the central portion of the retina including more and/or denser cones while the peripheral portion includes fewer and/or less dense cones. To account for the variation in sensitivity to visible light, at least in some instances, the field of view of a human's eye may be divided into a focus (e.g., foveal or high resolution) region, which is centered on its viewing angle, corresponding with the central portion of the eye's retina and one or more periphery (e.g., non-foveal or low resolution) regions, which are outside the focus region, corresponding with the peripheral portion of the eye's retina.

In other words, at least in some instances, the portion of light emitted from a display pixel (e.g., color component sub-pixel) that is actually perceived by a user's (e.g., human's) eye may vary with its field of view and, thus, its viewing characteristics (e.g., angle, location, and/or aperture size) that resulted in the field of view. For example, a color component sub-pixel may appear brighter when viewed from a viewing angle of zero (e.g., pupil oriented along normal axis) and darker when viewed from a non-zero viewing angle (e.g., pupil orientation different from normal axis). In fact, due to spatial offset between color component sub-pixels implemented on a display panel, a user's eye may concurrently view multiple color component sub-pixels with different viewing angles. In other words, at least in some instances, a first color component sub-pixel may appear brighter and a second color component sub-pixel may appear darker when the display panel is viewed with a first viewing angle whereas the first color component sub-pixel may appear darker and the second color component sub-pixel may appear brighter when the display panel is viewed with a second (e.g., different) viewing angle. Since a user's eye generally perceives different colors by averaging perceived light emission from multiple color component sub-pixels, at least in some instances, variations in perceived luminance of color component sub-pixels resulting from different sets of viewing characteristics may produce a perceivable color shift in image content displayed on the display panel.

Furthermore, as described above, a display panel may include an encapsulation layer implemented between a light-emissive element, such as an organic light-emitting diode (OLED) of a color component sub-pixel, and a color filter layer and, thus, light rays emitted from the light-emissive element pass through the encapsulation layer and the color filter layer before exiting an outward-facing viewing surface of the display panel. Additionally, as described above, light emitted from a light source, such as a light-emissive element (e.g., OLED) of a color component sub-pixel, generally radiates outwardly from the light source, for example, in a conical shape. In fact, due to radiation (e.g., spread) of light rays emitted from a light-emissive element of a color component sub-pixel and the distance the light rays travel before exiting the color filter layer, at least in some instances, a portion of the light rays emitted from the light-emissive element of the color component sub-pixel may actually pass through a color filter cell of a neighboring (e.g., different colored) color component sub-pixel, thereby producing optical crosstalk. For example, a portion of light emitted from an organic light-emitting diode of a red sub-pixel may pass through a red color filter cell of the red sub-pixel while another portion of the light emitted from the organic light-emitting diode passes through a green color filter cell of a neighboring green sub-pixel.

When color filter cell footprints are centered over corresponding light-emissive elements, viewing a display panel with a viewing angle of zero generally results in the light that is emitted from the light-emissive elements and actually perceived by a user's (e.g., human's) eye passing through appropriately colored color filter cells. However, as viewing angle moves away from zero, a user's eye may end up perceiving more of the light that passes through a neighboring (e.g., inappropriately colored) color filter cell, thereby increasing perceivability of color shift resulting from optical crosstalk. In other words, different sets of viewing characteristics may affect the resulting field of view and, thus, color of light emitted from a display panel that is actually perceived by a user's eye, which, at least in some instances, may result in a perceivable color shift in image content displayed on the display panel. That is, the color shift may result in a perceived color in image content displayed on a display panel perceivably differing from a corresponding target color, which, at last in some instances, may affect perceived quality of the image content and, thus, potentially the display panel displaying the image content, an electronic display including the display panel, and/or an electronic device including the display panel.

Accordingly, to improve perceived quality, the present disclosure provides techniques for implementing and/or operating an electronic device to reduce perceivability and/or likelihood of a color shift occurring in displayed image content, for example, due to optical crosstalk between neighboring (e.g., differently colored) color component sub-pixels. In particular, the present disclosure provides techniques for implementing and/or operating the electronic device to adaptively process image data to compensate for (e.g., offsetting) color shift expected to result from optical crosstalk. To further improve perceived image quality, in some embodiments, an electronic device may include image processing circuitry implemented and/or operated to process image data before processed (e.g., display) image data is supplied to an electronic display to display corresponding image content. For example, the image processing circuitry may include a burn-in compensation (BIC) block (e.g., circuitry group), which is implemented and/or operated to process image data to account for light emission variations resulting from display pixel aging (e.g., burn-in), and/or a white point compensation (WPC) block (e.g., circuitry group), which is implemented and/or operated to process image data to account for color variations (e.g., shifts) resulting from environmental conditions, such as temperature (e.g., in addition to backlight brightness level). Moreover, to reduce color shift resulting from optical crosstalk, the image processing circuitry may include an optical crosstalk compensation (OXTC) block (e.g., circuitry group), which is implemented and/or operated to process image data based at least in part on optical crosstalk compensation parameters.

To compensate for (e.g., offset) color shift resulting from optical crosstalk, in some embodiments, the optical crosstalk compensation (OXTC) parameters may include one or more optical crosstalk compensation factor maps, which each explicitly associates (e.g., maps) one or more pixel positions on a display panel to one or more optical crosstalk compensation factors (e.g., offset values and/or gain values) to be applied to image data corresponding with a display pixel at the pixel position. In fact, in some embodiments, an optical crosstalk compensation factor map may explicitly associate a pixel position with a set of multiple optical crosstalk compensation factors. For example, the optical crosstalk compensation factors associated with a pixel position may be indicated as a matrix of any suitable dimension (e.g., three-by-three when the display includes display pixels of three different colors such as red, green, and blue; four-by-four when the display includes display pixels of four different colors such as red, green, blue, and white). The matrix may include, for example, a red optical crosstalk compensation factor, a red-to-green optical crosstalk compensation factor, a red-to-blue optical crosstalk compensation factor, a green-to-red optical crosstalk compensation factor, a green optical crosstalk compensation factor, a green-to-blue optical crosstalk compensation factor, a blue-to-red optical crosstalk compensation factor, a blue-to-green optical crosstalk compensation factor, and a blue optical crosstalk compensation factor. Input image data of an input image frame may be sent to the optical crosstalk compensation block. When the input image data associated with the pixel position is received, the optical crosstalk compensation block may apply each of the multiple optical crosstalk compensation factors to the input image data, for example, by multiplying the three-by-three matrix with a three-by-one matrix (e.g., vector) including red component input image data, green component input image data, and blue component input image data.

Moreover, in some embodiments, an optical crosstalk compensation factor map to be used by image processing circuitry of an electronic device may be stored in memory on the electronic device. In other words, in such embodiments, the size of the optical crosstalk compensation factor map may affect the amount of storage capacity employed by the electronic device to perform compensation for optical crosstalk. As such, to conserve (e.g., improve, optimize) storage capacity of the electronic device, an optical crosstalk compensation factor map may explicitly associate each of a subset of pixel positions on a display panel with one or more corresponding optical crosstalk compensation factors. In other words, one or more pixel positions on the display panel and, thus, corresponding optical crosstalk compensation factors may not be explicitly identified in the optical crosstalk compensation factor map.

When a pixel position is not explicitly identified in an optical crosstalk compensation factor map, the optical crosstalk compensation block may determine an optical crosstalk compensation factor to be applied to image data corresponding with the pixel position by interpolating optical crosstalk compensation factors associated with other pixel positions explicitly identified in the optical crosstalk compensation factor map, for example, using linear interpolation, bi-linear interpolation, spline interpolation, and/or the like. As described above, in some embodiments, a pixel position may be associated with a set of multiple optical crosstalk compensation factors. In such embodiments, when a pixel position is not explicitly identified in an optical crosstalk compensation factor map, the optical crosstalk compensation block may determine a set of optical crosstalk compensation factor to be applied to image data corresponding with the pixel position by interpolating sets of optical crosstalk compensation factors associated with other pixel positions explicitly identified in the optical crosstalk compensation factor map. For example, the optical crosstalk compensation block may determine a red optical crosstalk compensation factor to be applied to image data corresponding with the pixel position by interpolating red optical crosstalk compensation factors associated with other pixel positions explicitly identified in the optical crosstalk compensation factor map, a red-to-green optical crosstalk compensation factor to be applied to image data corresponding with the pixel position by interpolating red-to-green optical crosstalk compensation factor associated with the other pixel positions explicitly identified in the optical crosstalk compensation factor map, and so on.

At least in some instances, susceptibility to perceivable color shift may vary across a display panel. For example, an outer (e.g., side) portion of the display panel may be more susceptible to perceivable color shift than a central portion of the display panel due to panel implementation parameters being optimized for a viewing angle of zero (e.g., pupil oriented along normal axis of display panel). To account for variation in color shift susceptibility and interpolation error, in some embodiments, the pixel positions on a display panel explicitly identified in an optical crosstalk compensation factor map may be non-uniformly spaced (e.g., distributed).

For example, the optical crosstalk compensation factor map may utilize a finer granularity for the outer portion of the display panel by explicitly identifying more pixel positions per area in the outer portion and utilize a coarser granularity for the central portion of the display panel by explicitly identifying fewer pixel positions per area in the central portion.

In some embodiments, a single (e.g., static) optical crosstalk compensation factor map may be calibrated to a display panel to account for multiple different sets of viewing characteristics, for example, which each includes a viewing (e.g., pupil or gaze) angle, a viewing location (e.g., pupil offset from center and/or pupil relief), and a viewing aperture (e.g., pupil or eye box) size. However, as described above, a resulting field of view and, thus, perceivability of color shift resulting from optical crosstalk generally varies when a display panel is viewed using different sets of viewing characteristics. As such, to improve the efficacy of optical crosstalk compensation, the optical crosstalk compensation block may additionally or alternatively include and/or have access to multiple candidate optical crosstalk compensation factor maps, which are each calibrated for a different set of viewing characteristics. In other words, in such embodiments, the optical crosstalk compensation block may select a different candidate optical crosstalk compensation factor map as a target candidate optical crosstalk compensation factor map under different sets of viewing characteristics and, thus, adaptively adjust processing of input image data.

To adaptively adjust processing performed on image data, an optical crosstalk compensation block may receive one or more viewing characteristic parameters indicative of a set of viewing characteristics with which a display panel to be used to display corresponding image content is expected to be viewed, for example, from an eye (e.g., pupil) tracking sensor (e.g., camera). In particular, the viewing characteristic parameters may indicate a horizontal (e.g., x-direction) offset of pupil position from a default (e.g., forward-facing) pupil position and a vertical (e.g., y-direction) offset of pupil position from the default pupil position and, thus, may be indicative of expected viewing angle. Additionally, in some embodiments, the viewing characteristic parameters may indicate a pupil relief (e.g., distance from pupil to display panel) and, thus, may be indicative of expected viewing location. Furthermore, in some embodiments, the viewing characteristic parameters may indicate a pupil size and, thus, may be indicative of expected viewing aperture size.

Furthermore, as described above, the field of view (FOV) of a human's (e.g., user's) eye generally includes a focus region that is more sensitive to visible light and one or more periphery regions outside the focus region that are less sensitive to visible light. To Leverage the reduced sensitivity outside the focus region, in some embodiments, image data may be stored in a foveated (e.g., compressed or grouped) domain that utilizes a pixel resolution different from (e.g., lower than) a panel (e.g., native or non-foveated) domain of a display panel to be used to display corresponding image content, for example, to conserve (e.g., optimizing) storage capacity of the electronic device. In particular, in the foveated domain, an image frame may be divided in multiple foveation regions (e.g., tiles) in which different pixel resolutions are utilized. For example, a central (e.g., first) foveation region may be identified in an image frame such that it is co-located with a focus (e.g., foveal) region of the field of view with which the image frame is expected to be viewed (e.g., visually perceived). Since the sensitivity to visible light in the focus region is higher, in some embodiments, the central foveation region may utilize a pixel resolution that matches the (e.g., full) pixel resolution of the display panel.

Moreover, certain electronic displays, known as "foveated" displays, display images at higher resolution where a viewer is looking and at lower resolution in the peripheral vision of the viewer. The image data for foveated displays thus may have some pixels that are grouped (e.g., foveation regions) together to display the same image data. To perform correct interpolation for a foveated display, the different regions that are relative to the central viewing region may be handled to account for their positions so as not to introduce distortion at region boundaries on the display panel. Moreover, the OXTC block may calculate optical crosstalk weighted compensation for display pixels based on distances of the display pixels relative to the gaze location. The compensated image data may be output for display.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a wearable device such as a watch, an augmented reality or virtual reality or mixed reality headset and/or augmented reality glasses, a vehicle dashboard, or the like. Thus, it should be noted that FIG. 1 is one example of a particular implementation and is intended to illustrate the types of components that may be present in an electronic device 10.

The electronic device 10 includes the electronic display 12, image processing circuitry 11, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and eye tracker 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. Before being used to display a corresponding image on the electronic display 12, the image data may be processed via the image processing circuitry 11. The image processing circuitry 11 may process the image data for display on one or more electronic displays 12. For example, the image processing circuitry 11 may include a display pipeline, memory-to-memory scaler and rotator (MSR) circuitry, warp compensation circuitry, or additional hardware or software means for processing image data. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image processing circuitry 11 may be implemented in the electronic device 10, in the electronic display 12, or a combination thereof. For example, the image processing circuitry 11 may be included in the processor core complex 18, a timing controller (TCON) in the electronic display 12, or any combination thereof.

In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

The eye tracker 28 may measure positions and movement of one or both eyes of someone viewing the electronic display 12 of the electronic device 10. For instance, the eye tracker 28 may include a sensor (e.g., a camera) that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. Accordingly, the eye tracker 28 may output viewing characteristic parameters indicative of viewing characteristics with which a user's eye is viewing or is expected to view on the electronic display 12. For example, the viewing characteristic parameters may indicate a horizontal (e.g., x-direction) offset of the eye's pupil from a default (e.g., forward facing) pupil position and a vertical (e.g., y-direction) offset of the eye's pupil from the default pupil position and, thus, may be indicative of expected viewing angle. Additionally or alternatively, the viewing characteristic parameters may indicate a pupil relief (e.g., distance from pupil to display panel) and, thus, may be indicative of expected viewing location. The processor core complex 18 may use the viewing angle(s) of the eyes of the viewer when generating image data for display on the electronic display 12.

Figure 2:
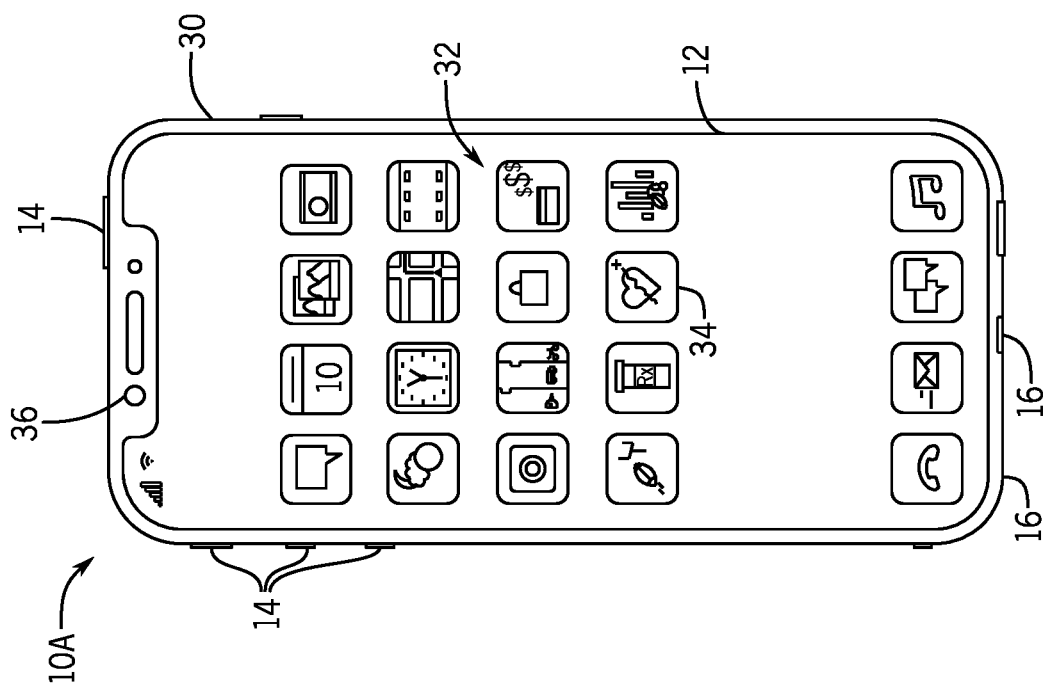
FIG. 2 is a perspective view of a notebook computer representing an embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch. The handheld device 10A includes one or more cameras 36 for capturing images.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
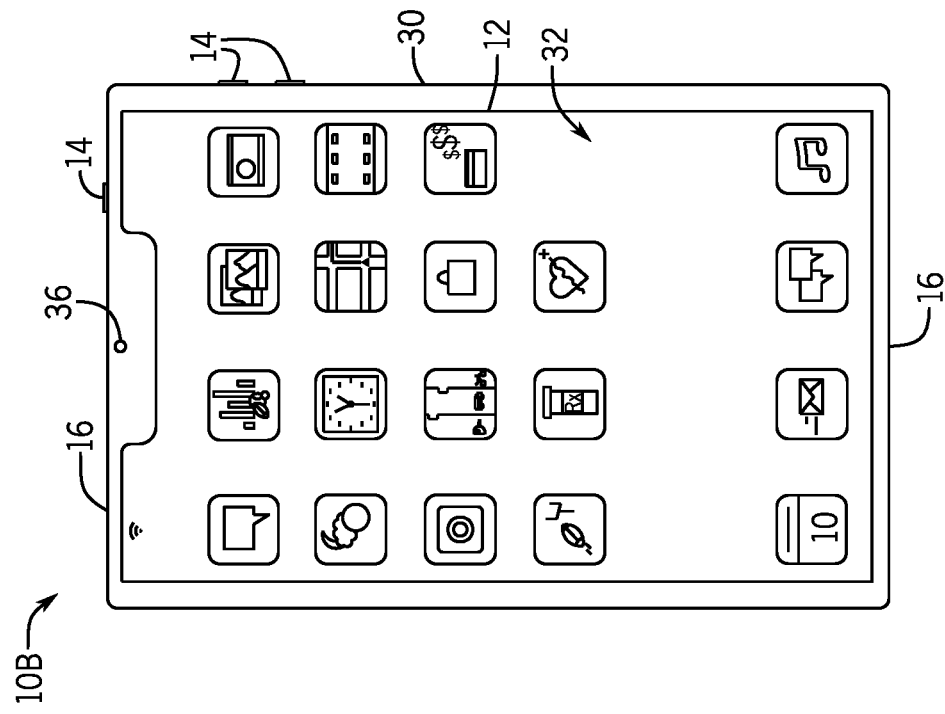
FIG. 3 is a front view of a handheld device representing another embodiment of the electronic device of FIG. 1.
Figure 4:
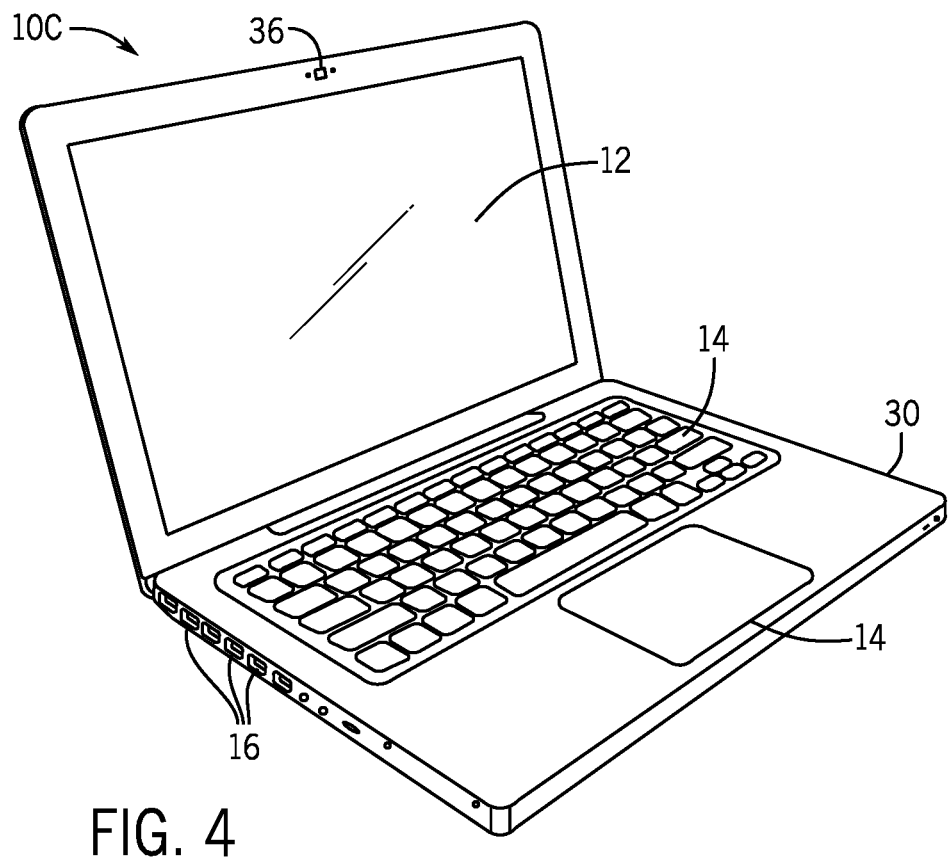
FIG. 4 is a front view of another handheld device representing another embodiment of the electronic device of FIG. 1.
Figure 5:
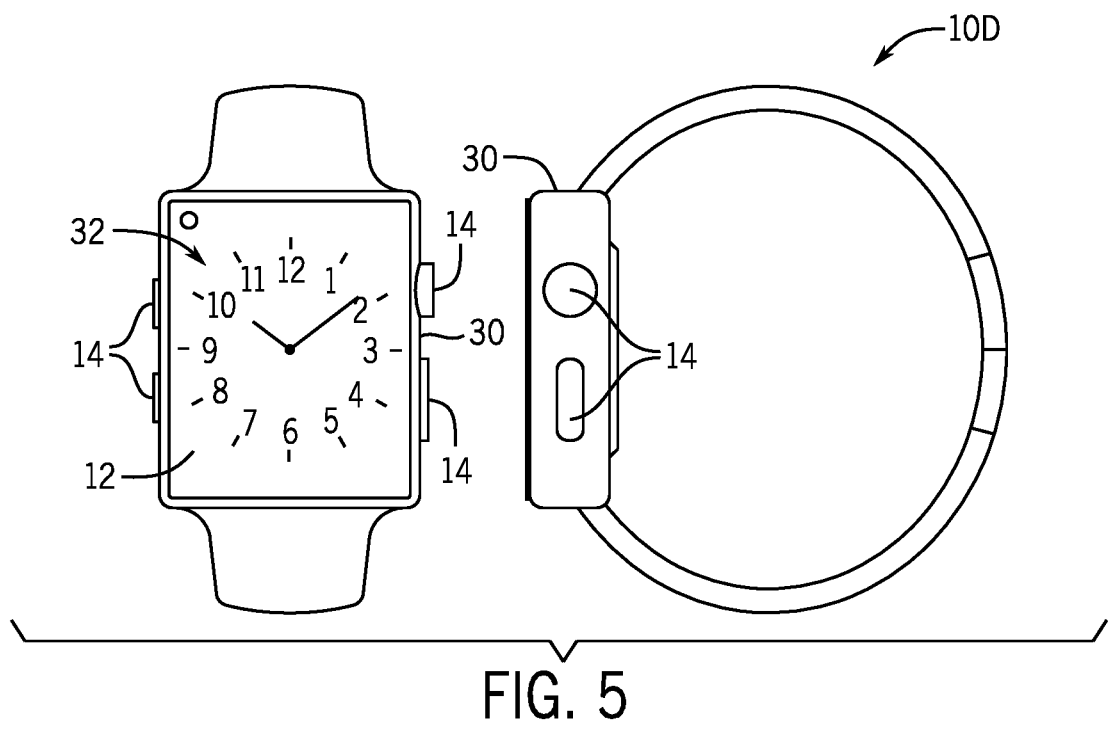
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a wearable electronic device 10D, is shown in FIG. 5. For illustrative purposes, the wearable electronic device 10D may be any Apple Watch® model available from Apple Inc. As depicted, the tablet device the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
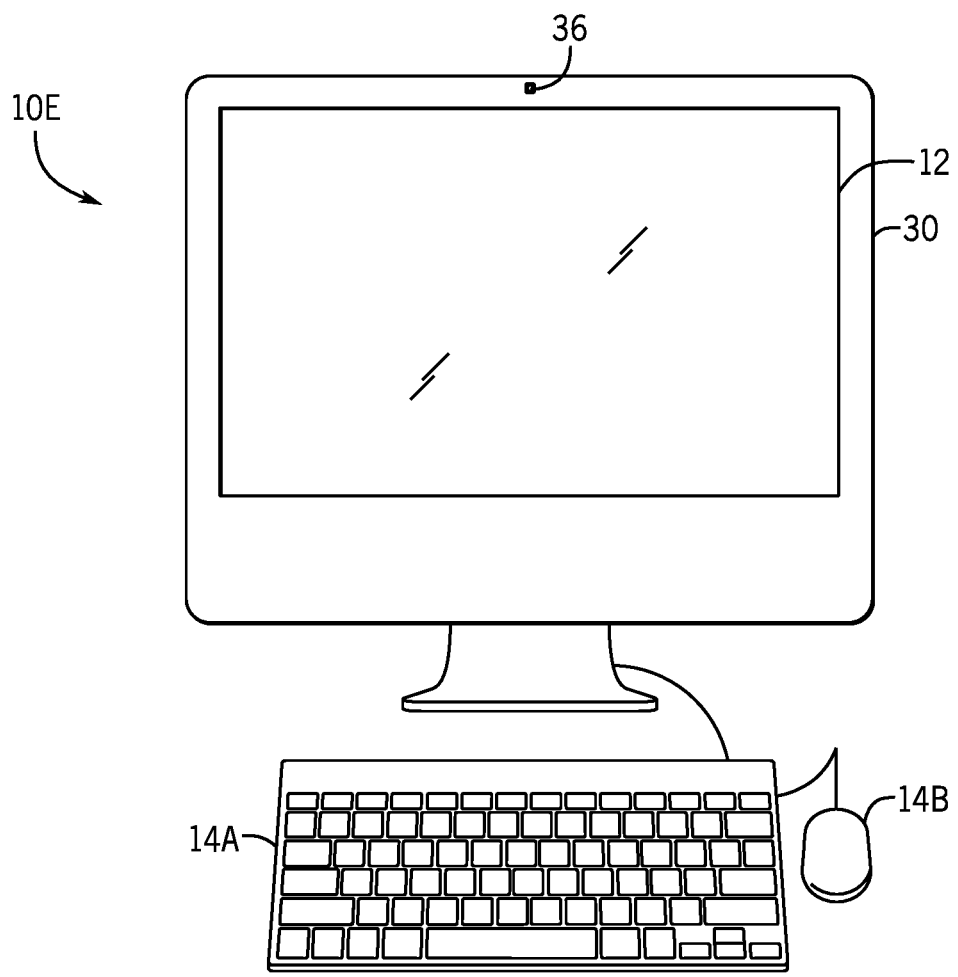
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer using various peripheral input structures 14, such as the keyboard 14A or mouse 14B (e.g., input structures 14), which may connect to the computer 10E.

Figure 7:
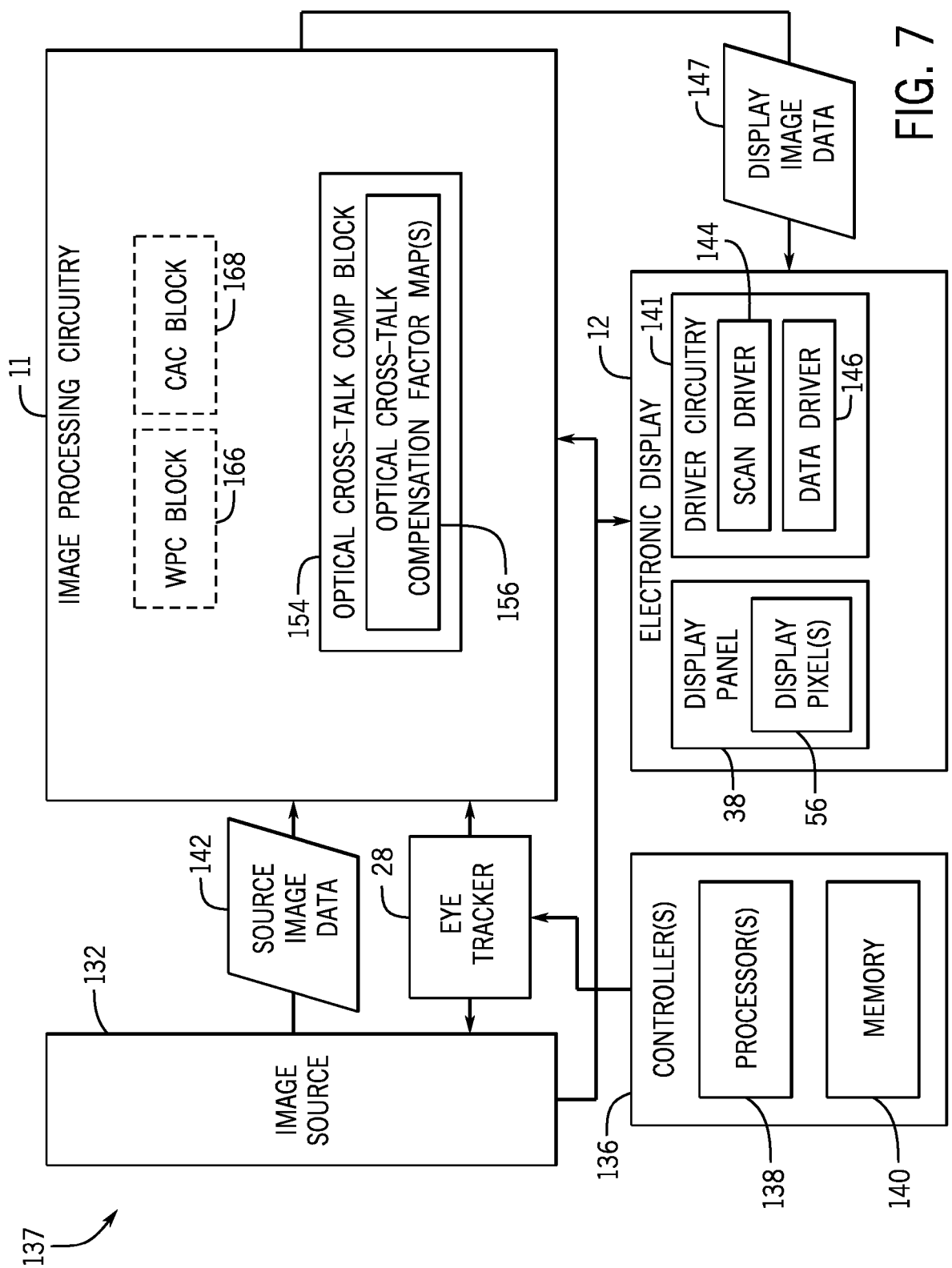
FIG. 7 is a block diagram of an example portion of the electronic device of FIG. 1 including an electronic display and image processing circuitry, according to embodiments of the present disclosure.

To help illustrate, a portion 137 of the electronic device 10, including image processing circuitry 11, is shown in FIG. 7. As should be appreciated, although image processing is discussed herein as being performed via a number of image data processing blocks, embodiments may include hardware (e.g., circuitry) or software components to carry out the techniques discussed herein. The electronic device 10 may include an image source 132, a display panel 38, and/or a controller 136 in communication with the image processing circuitry 11 and one or more eye trackers 28. In some embodiments, the display panel 38 of the electronic display 12 may be a reflective technology display, a liquid crystal display (LCD), or any other suitable type of display panel. In some embodiments, the controller 136 may control operation of the image processing circuitry 11, the electronic display 12, the one or more eye trackers 28, the image source 132, or any combination thereof. Although depicted as a single controller 136, in other embodiments, one or more separate controllers 136 may be used to control operation of the image source 132, the image processing circuitry 11, the electronic display 12, the one or more eye trackers 28, or any combination thereof.

To control operation, the controller 136 may include one or more controller processors 138 and/or controller memory 140. In some embodiments, the controller processor 138 may be included in the processor core complex 18, the image processing circuitry 11, a timing controller (TCON) in the electronic display 12, a separate processing module, or any combination thereof and execute instructions stored in the controller memory 140. Additionally, in some embodiments, the controller memory 140 may be included in the local memory 20, the main memory storage device 22, a separate tangible, non-transitory, computer-readable medium, or any combination thereof.

Generally, the image source 132 may be implemented and/or operated to generate source (e.g., input or original) image data 142 corresponding with image content to be displayed on the display panel 38 of the electronic display 12. Thus, in some embodiments, the image source 132 may be included in the processor core complex 18, a graphics processing unit (GPU), an image sensor (e.g., camera), and/or the like. Additionally, in some embodiments, the source image data 142 may be stored in the electronic device 10 before supply to the image processing circuitry 11, for example, in main memory 20, a storage device 22, and/or a separate, tangible, non-transitory computer-readable medium. In fact, as well be described in more detail below, to conserve (e.g., optimizing) storage capacity of the electronic device 10, in some embodiments, the source image data 142 may be stored and/or supplied to the image processing circuitry 11 in a foveated (e.g., compressed or grouped) domain, which utilizes a pixel resolution different from (e.g., lower than) a panel (e.g., native or non-foveated) domain of the display panel 38.

As illustrated in FIG. 7, the display panel 38 of the electronic display 12 may include one or more display pixels 56, which each include one or more color component sub-pixels. For example, each display pixel 56 implemented on the display panel 38 may include a red sub-pixel, a blue sub-pixel, and a green sub-pixel. In some embodiments, one or more display pixel 56 on the display panel 38 may additionally or alternatively include a white sub-pixel. The electronic display 12 may display image content on its display panel 38 by appropriately controlling light emission from display pixels (e.g., color component sub-pixels) 56 implemented thereon. Generally, light emission from a display pixel (e.g., color component sub-pixel) 56 may vary with the magnitude of electrical energy stored therein. For example, in some instances, a display pixel 56 may include a light-emissive element, such as an organic light-emitting diode (OLED), that varies its light emission with current flow there through, a current control switching device (e.g., transistor) coupled between the light-emissive element and a pixel power (e.g., $V_{DD}$) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light-emissive element of the display pixel 56.

However, it should be appreciated that discussion with regard to OLED examples are intended to be illustrative and not limiting. In other words, the techniques described in the present disclosure may be applied to and/or adapted for other types of electronic displays 12, such as a liquid crystal display (LCD) 12 and/or a micro light-emitting diode (LED) electronic displays 12. In any case, since light emission from a display pixel 56 generally varies with electrical energy storage therein, to display an image, an electronic display 12 may write a display pixel 56 at least in part by supplying an analog electrical (e.g., voltage and/or current) signal to the display pixel 56, for example, to charge and/or discharge a storage capacitor in the display pixel 56.

To selectively write its display pixels 56, as in the depicted example, the electronic display 12 may include driver circuitry 141, which includes a scan driver 144 and a data driver 146. In particular, the electronic display 12 may be implemented such that each of its display pixels 56 is coupled to the scan driver 144 via a corresponding scan line and to the data driver 146 via a corresponding data line. Thus, to write a row of display pixels 56, the scan driver 144 may output an activation (e.g., logic high) control signal to a corresponding scan line that causes each display pixel 56 coupled to the scan line to electrically couple its storage capacitor to a corresponding data line. Additionally, the data driver 146 may output an analog electrical signal to each data line coupled to an activated display pixel 56 to control the amount of electrical energy stored in the display pixel 56 and, thus, control the resulting light emission (e.g., perceived luminance and/or perceived brightness).

As described above, image data corresponding with image content be indicative of target visual characteristics (e.g., luminance and/or color) at one or more specific points (e.g., image pixels) in the image content, for example, by indicating color component brightness (e.g., grayscale) levels that are scaled by a panel brightness setting. In other words, the image data may correspond with a pixel position on a display panel and, thus, indicate target luminance of at least a display pixel 56 implemented at the pixel position. For example, the image data may include red component image data indicative of target luminance of a red sub-pixel in the display pixel 56, blue component image data indicative of target luminance of a blue sub-pixel in the display pixel 56, green component image data indicative of target luminance of a green sub-pixel in the display pixel 56, white component image data indicative of target luminance of a white sub-pixel in the display pixel 56, or any combination thereof. As such, to display image content, the electronic display 12 may control supply (e.g., magnitude and/or duration) of electrical signals from its data driver 146 to its display pixels 56 based at least in part on corresponding image data.

To improve perceived image quality, image processing circuitry 11 may be implemented and/or operated to process (e.g., adjust) image data before the image data is used to display a corresponding image on the electronic display 12. Thus, in some embodiments, the image processing circuitry 11 may be included in the processor core complex 18, a display pipeline (e.g., chip or integrated circuit device), a timing controller (TCON) in the electronic display 12, or any combination thereof. Additionally or alternatively, the image processing circuitry 11 may be implemented as a system-on-chip (SoC).

As in the depicted example, the image processing circuitry 11 may be implemented and/or operated to process the source image data 142 output from the image source 132. In some embodiments, the image processing circuitry 11 may directly receive the source image data 142 from the image source 132. Additionally or alternatively, the source image data 142 output from the image source 132 may be stored in a tangible, non-transitory, computer-readable medium, such as main memory 20, and, thus, the image processing circuitry 11 may receive (e.g., retrieve) the source image data 142 from the tangible, non-transitory, computer-readable medium, for example, via a direct memory access (DMA) technique. The image processing circuitry 11 may then process the source image data 142 to generate display (e.g., processed or output) image data 147, for example, which adjusts target luminances to compensate for expected optical crosstalk and, thus, the resulting color shift.

To conserve (e.g., improve, optimize) the storage capacity of the electronic device 10, in some embodiments, the source image data 142 received by the image processing circuitry 11 may be indicated in a foveated (e.g., compressed or grouped) domain, which utilizes a pixel resolution different from (e.g., lower than) a panel (e.g., native or non-foveated) domain of the display panel 38. In particular, in the foveated domain, an image frame may be divided in multiple foveation regions (e.g., tiles) in which different pixel resolutions are utilized. Moreover, certain electronic displays, known as "foveated" displays, display images at higher resolution where a viewer is looking and at lower resolution in the peripheral vision of the viewer. The image data for foveated displays thus may have some pixels that are grouped (e.g., foveation regions) together to display the same image data.

Figure 8:
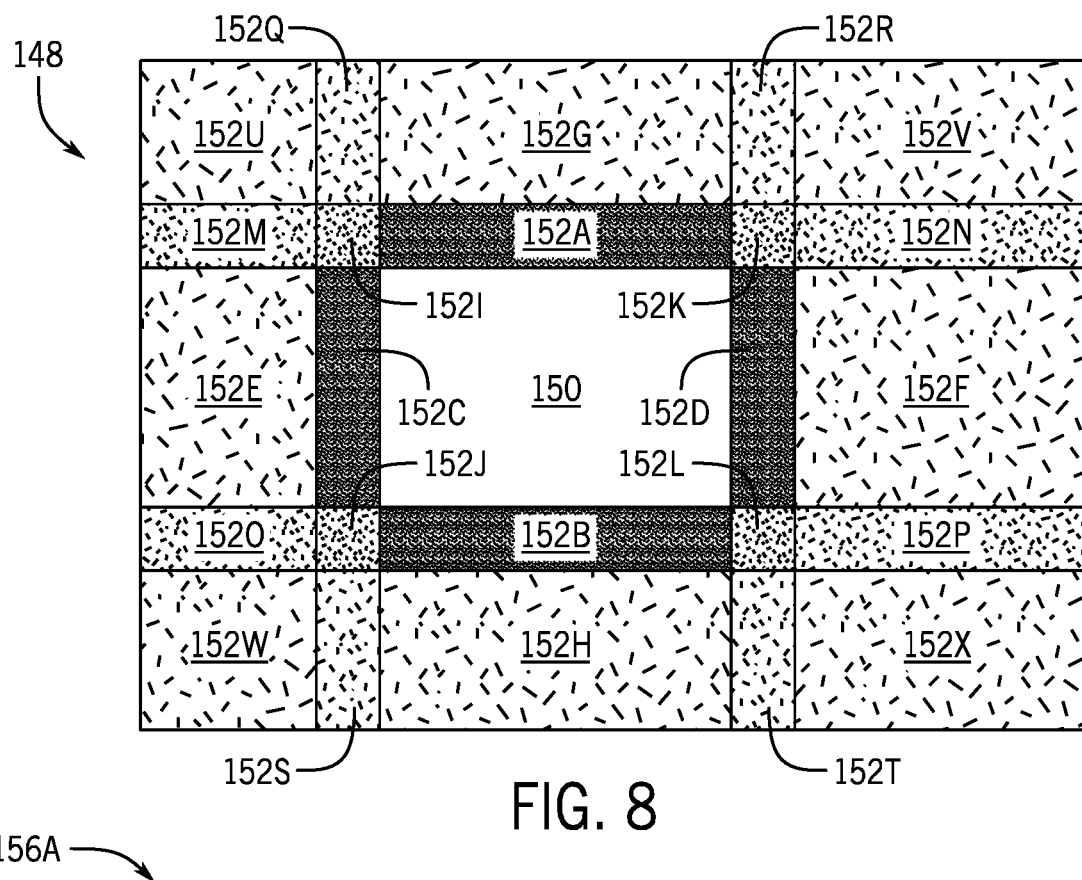
FIG. 8 is a diagrammatic representation of example image frame divided into multiple foveation regions, according to embodiments of the present disclosure.

To help illustrate, an example of an image frame 148 divided into multiple foveation regions is shown in FIG. 8. As depicted, a central foveation region 150 is identified in the image frame 148, which is displayed on the display panel 38. Additionally, as depicted, multiple outer foveation regions 152 outside of the central foveation region 150 are identified in the image frame 148.

In some embodiments, the central foveation region 150 and one or more outer foveation regions 152 may be identified based at least in part on a field of view (FOV) with which the display panel 38 is expected to be viewed and, thus, based at least in part on viewing characteristics (e.g., viewing angle and/or viewing location) with which the display panel 38 is expected to be viewed. For example, the viewing characteristics may be indicated by one or more viewing characteristic parameters received from the eye tracker 28. In particular, in such embodiments, the central foveation region 150 may be identified in the image frame 148 such that the central foveation region 150 is co-located with a focus region of the field of view (FOV). In addition, an outer foveation region 152 is identified in the image frame 148 such that the outer foveation region 152 is co-located with a periphery region of the field of view. In other words, the depicted example may be identified when the focus region of the field of view is expected to be centered on a central portion of the display panel 38.

In some embodiments, a change in viewing characteristics may change the field of view and, thus, characteristics (e.g., size, location, and/or pixel resolution) of foveation regions identified in the image frame 148. For example, a change in viewing angle may move the focus region on the display panel 38, which may result in the central foveation region 150 being shifted relative to the center of the image frame 148. Additionally or alternatively, a change in viewing location that increases the size of the focus region may result in the size of central foveation region 150 being expanded (e.g., increased), while a change in viewing location that decreases the size of the focus region may result in the size of central foveation region 150 being contracted (e.g., decreased or reduced).

To improve perceived image quality, in some embodiments, the pixel resolution used in the central foveation region 150 may maximize pixel resolution implemented on the display panel 38. In other words, in some embodiments, the central foveation region 150 may utilize a pixel resolution that matches the (e.g., full) pixel resolution of the display panel 38. That is, in such embodiments, each image pixel (e.g., image data corresponding with point in image) in the central foveation region 150 of the image frame 148 may correspond with single display pixel (e.g., set of one or more color component sub-pixels) 56 implemented on the display panel 38. In some embodiments, each outer foveation region 152 in the image frame 148 may utilize a pixel resolution lower than the pixel resolution of the central foveation region 150 and, thus, the (e.g., full) pixel resolution of the display panel 38. In other words, in such embodiments, each image pixel (e.g., image data corresponding with point in image) in an outer foveation region 152 of the image frame 148 may correspond with multiple display pixels (e.g., sets of one or more color component sub-pixels) 56 implemented on the display panel 38.

To account for variation in sensitivity to visible light outside the focus region, in some embodiments, different outer foveation regions 152 identified in the image frame 148 may utilize different pixel resolutions. In particular, in such embodiments, an outer foveation region 152 closer to the central foveation region 150 may utilize a higher pixel resolution. On the other hand, in such embodiments, an outer foveation region 152 farther from the central foveation region 150 may utilize a lower pixel resolution.

As an illustrative example, a first set of outer foveation regions 152 may include each outer foveation region 152 directly adjacent and outside the central foveation region 150. In other words, with regard to the depicted example, the first set of outer foveation regions 152 may include a first outer foveation region 152A, a second outer foveation region 152B, a third outer foveation region 152C, and a fourth outer foveation region 152D. Due to proximity to the central foveation region 150, in some embodiments, each outer foveation region 152 in the first set of outer foveation regions 152 may utilize a pixel resolution that is half the pixel resolution of the central foveation region 150 and, thus, the (e.g., full) pixel resolution of the display panel 38. In other words, in such embodiments, each image pixel (e.g., image data corresponding with point in image) in the first set of outer foveation regions 152 may correspond with two display pixels (e.g., sets of one or more color component sub-pixels) 56 implemented on the display panel 38.

Additionally, as an illustrative example, a second set of outer foveation regions 152 may include each outer foveation region 152 directly adjacent and outside the first set of outer foveation regions 152. In other words, with regard to the depicted example, the second set of outer foveation regions 152 may include a fifth outer foveation region 152E, a sixth outer foveation region 152F, a seventh outer foveation region 152G, an eighth outer foveation region 152H, a ninth outer foveation region 152I, a tenth outer foveation region 152J, an eleventh outer foveation region 152K, and a twelfth outer foveation region 152L. Due to being located outside of the first set of outer foveation regions 152, in some embodiments, each outer foveation region 152 in the second set of outer foveation regions 152 may utilize a pixel resolution that is half the pixel resolution of the first set of outer foveation regions 152 and, thus, a quarter of the pixel resolution of the central foveation region 150 and the display panel 38. In other words, in such embodiments, each image pixel (e.g., image data corresponding with point in image) in the second set of outer foveation regions 152 may correspond with four display pixels (e.g., sets of one or more color component sub-pixels) 56 implemented on the display panel 38.

Furthermore, as an illustrative example, a third set of outer foveation regions 152 may include each outer foveation region 152 directly adjacent and outside the second set of outer foveation regions 152. In other words, with regard to the depicted example, the third set of outer foveation regions 152 may include a thirteenth outer foveation region 152M, a fourteenth outer foveation region 152N, a fifteenth outer foveation region 152O, a sixteenth outer foveation region 152P, a seventeenth outer foveation region 152Q, an eighteenth outer foveation region 152R, a nineteenth outer foveation region 152S, and a twentieth outer foveation region 152T. Due to being located outside of the second set of outer foveation regions 152, in some embodiments, each outer foveation region 152 in the third set of outer foveation regions 152 may utilize a pixel resolution that is half the second set of outer foveation regions 152 and, thus, an eighth of the pixel resolution of the central foveation region 150 and the display panel 38. In other words, in such embodiments, each image pixel (e.g., image data corresponding with point in image) in the third set of outer foveation regions 152 may correspond with eight display pixels (e.g., sets of one or more color component sub-pixels) 56 implemented on the display panel 38.

Moreover, as an illustrative example, a fourth set of outer foveation regions 152 may include each outer foveation region 152 directly adjacent and outside the third set of outer foveation regions 152. In other words, with regard to the depicted example, the second set of outer foveation regions 152 may include a twenty-first outer foveation region 152U, a twenty-second outer foveation region 152V, a twenty-third outer foveation region 152W, and a twenty-fourth outer foveation region 152X. Due to being located outside of the third set of outer foveation regions 152, in some embodiments, each outer foveation region 152 in the fourth set of outer foveation regions 152 may utilize a pixel resolution that is half the pixel resolution of the third set of outer foveation regions 152 and, thus, a sixteenth of the pixel resolution of the central foveation region 150 and the display panel 38. In other words, in such embodiments, each image pixel (e.g., image data corresponding with point in image) in the fourth set of outer foveation regions 152 may correspond with sixteen display pixels (e.g., sets of one or more color component sub-pixels) 56 implemented on the display panel 38.

Returning to the image processing circuitry 11 of FIG. 7, as described above, the image processing circuitry 11 may process source image data 142 to determine display image data 147, which may then be supplied to the electronic display 12 to display corresponding image content. As in the depicted example, in some embodiments, the image processing circuitry 11 may be organized into one or more image processing blocks (e.g., circuitry groups). For example, the image processing circuitry 11 may include an optical crosstalk compensation (OXTC) block 154, which is implemented and/or operated to process image data to compensate for perceivable color shift resulting from optical crosstalk between different colored sub-pixels on the display panel 38. As in the depicted example, to compensate for resulting color shift, the optical crosstalk compensation block 154 may include and/or utilize one or more optical crosstalk compensation (OXTC) factor maps 156.

Figure 9:
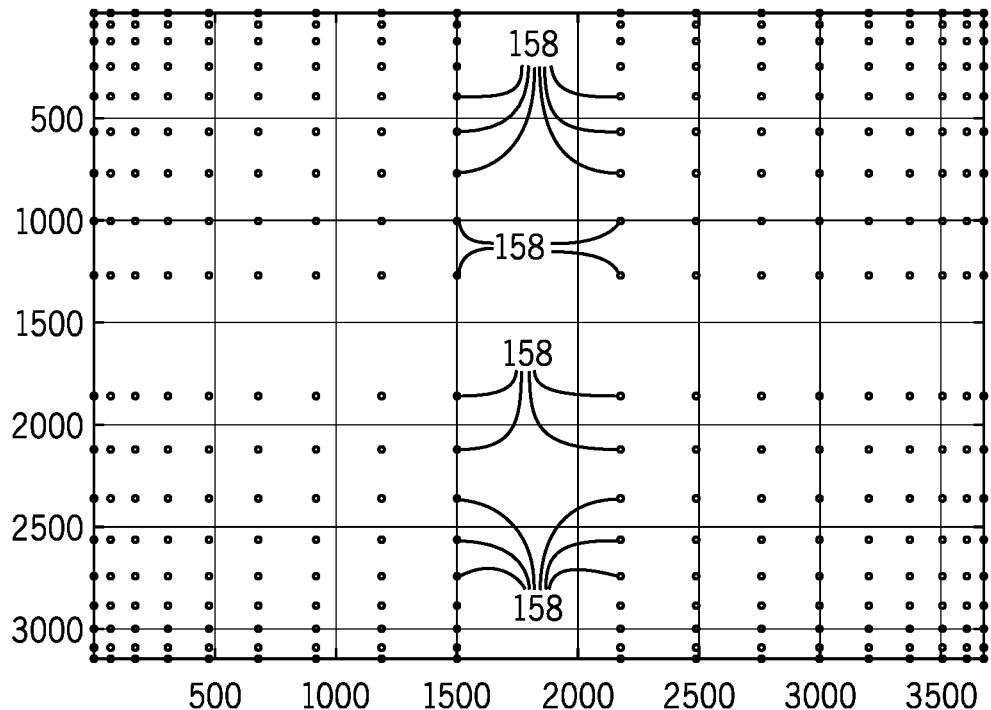
FIG. 9 is a diagrammatic representation of an example optical cross talk compensation factor map used by an optical crosstalk compensation (OXTC) block of FIG. 7, according to embodiments of the present disclosure.

An example of optical crosstalk compensation factor map 156A, which may be used by image processing circuitry 11 in an electronic device 10, is shown in FIG. 9. As depicted, the optical crosstalk compensation factor map 156A may explicitly identify one or more pixel positions 158 (e.g., illustrated in FIG. 9 using grid points) on the display panel 38. In particular, the optical crosstalk compensation factor map 156A may explicitly associate each identified pixel position 158 with one or more optical crosstalk compensation (OXTC) factors to be applied to image data corresponding with a display pixel 56 at the pixel position 158.

In fact, to compensate for optical crosstalk between neighboring color component sub-pixels on the display panel 38, in some embodiments, an optical crosstalk compensation factor map 156 may explicitly associate a pixel position 158 with a set of multiple optical crosstalk compensation factors. For example, the optical crosstalk compensation factors associated with a pixel position 158 may be indicated by a three-by-three matrix including nine factors, $F_R$, $F_{R2G}$, $F_{R2B}$, $F_{G2R}$, $F_G$, $F_{G2B}$, $F_{B2R}$, $F_{B2G}$, $F_B$, where $F_R$ is a red optical crosstalk compensation factor, $F_{R2G}$ is a red-to-green optical crosstalk compensation factor, $F_{R2B}$ is a red-to-blue optical crosstalk compensation factor, $F_{G2R}$ is a green-to-red optical crosstalk compensation factor, F G a green optical crosstalk compensation factor, $F_{G2B}$ a green-to-blue optical crosstalk compensation factor, $F_{B2R}$ is a blue-to-red optical crosstalk compensation factor, $F_{B2G}$ is a blue-to-green optical crosstalk compensation factor, and $F_B$ a blue optical crosstalk compensation factor. The optical crosstalk compensation factors may be stored in respective optical crosstalk compensation factor maps, which may be stored in corresponding lookup tables. For example, nine optical crosstalk compensation factor maps and thus nine lookup tables, may be used to store the nine optical crosstalk compensation factors in the three-by-three matrix described above. In such embodiments, when input image data associated with the pixel position is received, the optical crosstalk compensation block 154 may apply each of the multiple optical crosstalk compensation factors to the input image data, for example, by multiplying the three-by-three matrix with a three-by-one matrix (e.g., vector) including red component input image data, green component input image data, and blue component input image data.

Thus, in some embodiments, an optical crosstalk compensation factor may include a gain value, which when applied to image data, scales a target color component grayscale level indicated in the image data. Additionally or alternatively, an optical crosstalk compensation factor may include an offset value, which when applied to image data, biases a target color component grayscale level indicated in the image data. Furthermore, in some embodiments, the optical crosstalk compensation factor map 156 to be used by image processing circuitry 11 in an electronic device 10 may be stored in the electronic device 10, for example, in main memory 20, a storage device 22, internal memory of the image processing circuitry 11, and/or another tangible, non-transitory, computer-readable medium.

To conserve (e.g., improve, optimize) the storage capacity of the electronic device 10, as in the depicted example, the optical crosstalk compensation factor map 156A may explicitly identify a subset of pixel positions 158 (e.g., grid points illustrated in FIG. 9) on the display panel 38. In other words, in such embodiments, one or more pixel positions 158 and, thus, corresponding optical crosstalk compensation factors may not be explicitly identified in the optical crosstalk compensation factor map 156A. In such embodiments, when input image data associated with a pixel position 158 that is not explicitly identified in the optical crosstalk compensation factor map 156A, e.g., not overlapped with the grid points illustrated in FIG. 9, is received, the optical crosstalk compensation block 154 may determine one or more optical crosstalk compensation factors to be applied to the image data by interpolating factors associated with other pixel positions 158 that are explicitly identified in the optical crosstalk compensation factor map 156 (e.g., surrounding grid points). For example, linear interpolation, bilinear interpolation, spline interpolation, bicurvature interpolation, or the like, may be used. As an illustrative example, the optical crosstalk compensation block 154 may determine a red optical crosstalk compensation factor by interpolating red optical crosstalk compensation factors explicitly indicated in the optical crosstalk compensation factor map 156, a red-to-green optical crosstalk compensation factor by interpolating red-to-green optical crosstalk compensation factors explicitly indicated in the optical crosstalk compensation factor map 156, and so on.

The image processing circuitry 11 may process image data at least in part in a foveated (e.g., grouped or compressed) domain, which may be used by the source image data 142. For example, the OXTC block 154 may operate using the foveated domain to process part of the image data using pixel resolutions lower than the native pixel resolution of the display panel 38. As in the depicted example, the image processing circuitry 11 may include one or more other foveated domain blocks that operate using the foveated domain, such as a white point compensation (WPC) block 166 and a chromatic aberration compensation (CAC) block 168. The image data for foveated displays thus may have some pixels that are grouped together (e.g., foveation regions) to display the same image data.

Figure 10:
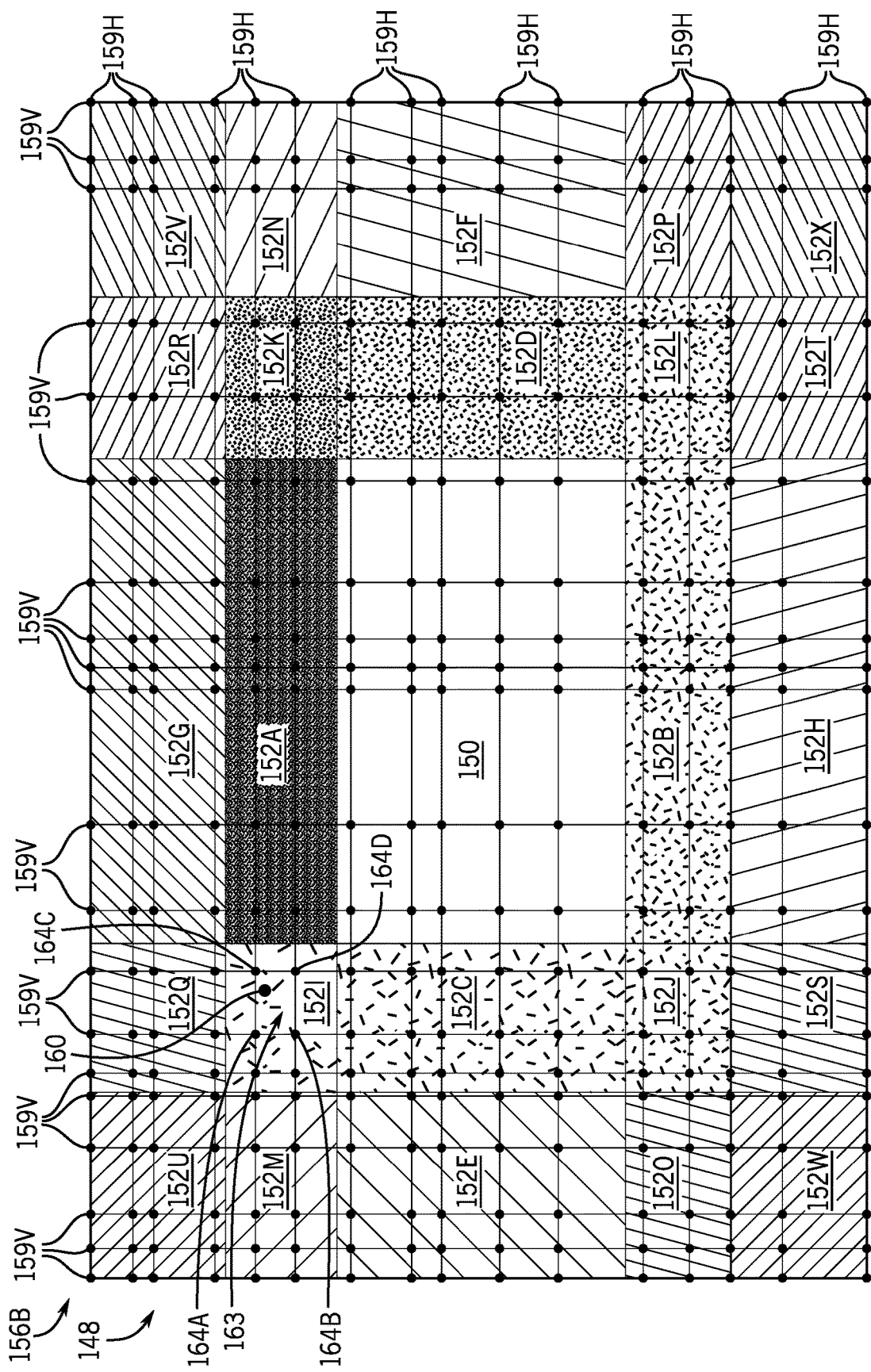
FIG. 10 is a diagrammatic representation of an example optical cross talk compensation factor map for the example image frame of FIG. 8, according to embodiments of the present disclosure.

FIG. 10 illustrate an example of optical crosstalk compensation (OXTC) factor map 156B together with the image frame 148. The OXTC factor map 156B may be defined for the panel 38 and include an 16×20 2D grid in the panel space to split the map into 15×19 tiles, with each tile a rectangular area defined by four neighboring grid points. For example, the OXTC factor map 156B may include 20 vertical grid lines 159V and 16 horizontal grid lines 159H, which form the 16×20 2D grid and 15×19 tiles. In order to accommodate for more local correction and flexibility for the 2D spatial transformation maps, the 2D grid may be non-uniformly spaced. Each grid point in the 16×20 2D grid may correspond to an optical crosstalk compensation factor (e.g., $F_R$, $F_{R2G}$, $F_{R2B}$, $F_{G2R}$, $F_G$, $F_{G2B}$, $F_{B2R}$, $F_{B2G}$, $F_B$) for image data associated with pixel positions at the corresponding grid point. Interpolations may be used to determine optical crosstalk compensation factors for image data associated with pixel positions not explicitly identified (e.g., grid points) in the OXTC factor map 156B. For example, for input image data associated with a pixel position 160 located in a tile 163 but not overlapped with any of the grid points, a 4-point interpolation (e.g., bilinear interpolation) may be used to determine the optical crosstalk compensation factors to be applied to the image data associated with the pixel position 160 by using the four grid points 164A, 164B, 164C, and 164D of the tile 163 on the OXTC factor map 156B.

As described above, in some embodiments, when operating in multiple resolutions, such as for a foveated display that displays multiple different resolutions of an image at different locations on the electronic display depending on a viewer's gaze or focal point on the display, the viewer's POV may change and content displayed in different locations as well as sizes, resolutions, or/and positions of the different locations may also change. In other words, which input pixels map to which output pixel positions on the display panel may change from time to time. For example, when the viewer's POV changes, the central foveation region 150 may be shifted relative to the center of the image frame 148, or the center of the optical crosstalk compensation (OXTC) factor map 156B, which is fixed on the panel 38. Accordingly, some image pixels or pixel groups of the image frame 148 may cross a grid line (e.g., 159V, 159H) on the optical crosstalk compensation (OXTC) factor map 156B. For example, the image pixel position 160 located in the tile 163 may be shifted by an offset value and may cross a grid boundary line of the tile 163. A grid boundary line is a grid line (e.g., 159V, 159H) at a boundary of a tile that separate the tile from another tile. For example, the tile 163 may have four grid boundary lines (e.g., a grid line pass through the grid points 164A and 164B, a grid line pass through the grid points 164A and 164C, a grid line pass through the grid points 164B and 164D, a grid line pass through the grid points 164C and 164D). To perform correct interpolation for a foveated display, the different regions (e.g., outer foveation regions 152) that are relative to the central foveation region 150 may be handled to account for their positions so as not to introduce distortion at region boundaries on the display panel. Thus, offset values (e.g., horizontal offset values, vertical offset values) may be used for using the interpolations to determine the optical crosstalk compensation factors to be applied to the image data associated with the pixel position 160. The image data may include image pixel groups in different foveation regions. For an image pixel group including multiple image pixels, the offset values may be determined by the offset values of the center location of the image pixel group, or a corner pixel of the image pixel group (e.g., an anchor pixel at the top left corner of the image pixel group), or both. The offset values of the center location and the anchor pixel may be related by a relationship associated with the number of pixels in the image pixel group. In the description below, an offset value of an image pixel group may refer to the offset value of the anchor pixel of the image pixel group.

Figure 11:
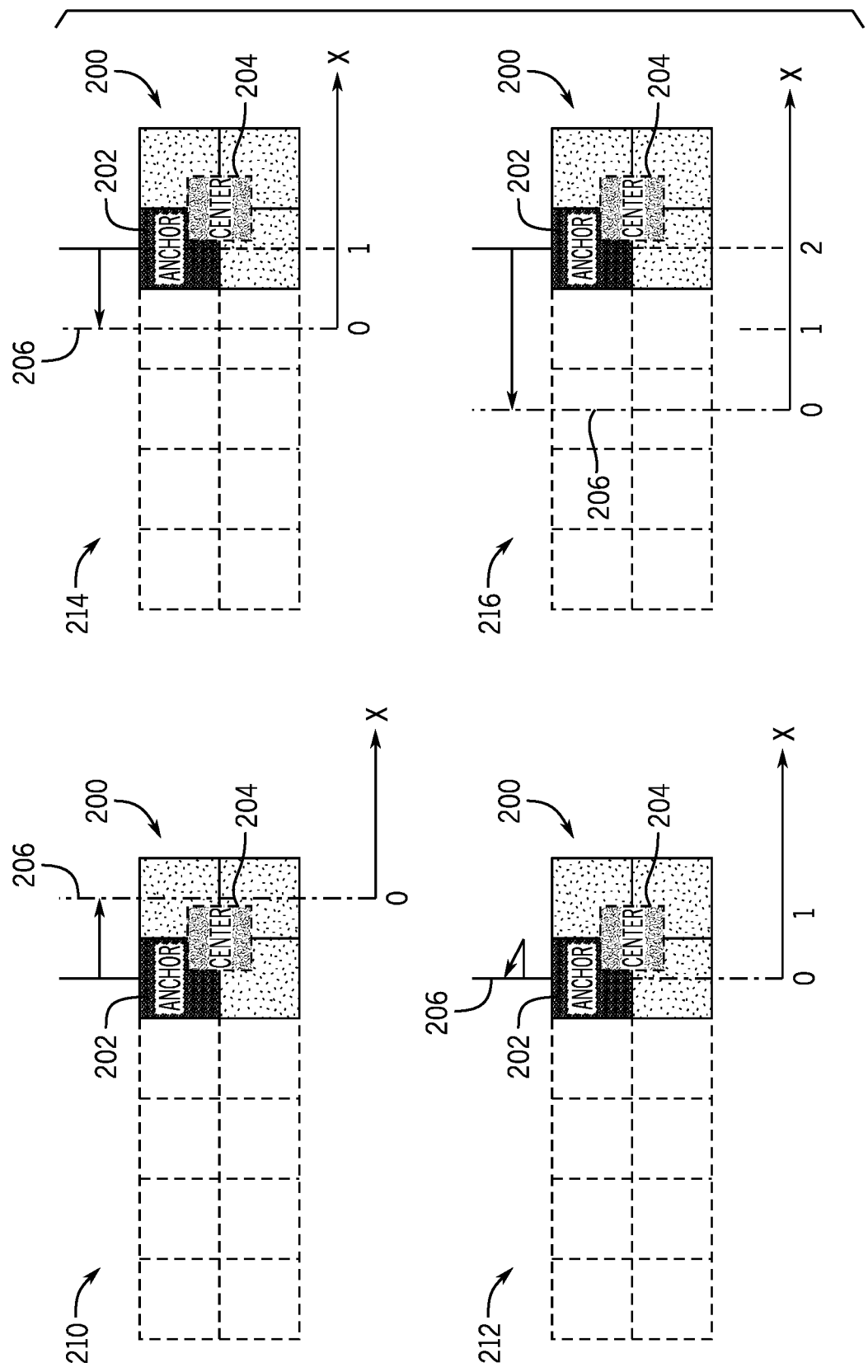
FIG. 11 is a block diagram of example offset values for a 2×2 pixel group, according to embodiments of the present disclosure.

FIG. 11 illustrates example offset values for an image pixel group 200 including 2×2 image pixels. The image pixel group 200 may include an anchor pixel 202 located at the top left corner of the image pixel group 200 in the panel space. The image pixel group 200 may also include a center location 204 in the panel space. The offset values of the image pixel group 200 may be determined by using the location of the anchor pixel 202 (e.g., the center of the anchor pixel 202) relative to one or more grid lines of an optical crosstalk compensation (OXTC) factor map (e.g., the optical crosstalk compensation (OXTC) factor map 156B).

In FIG. 11, a diagram 210 illustrates that a horizontal offset (e.g., along X axis) of the image pixel group 200 relative to the grid line 206 in the panel space has an unchanged value when no gird line crossing occurs (e.g., both the anchor pixel 222 and the center location 204 may not cross the grid line 206). A diagram 212 illustrates that a horizontal offset (e.g., along X axis) of the image pixel group 200 relative to the grid line 206 in the panel space has a value of 0 (e.g., X=0) indicating a zero-pixel offset of the anchor pixel 202 with the center location 204 crossing the grid line 206. A diagram 214 illustrates that a horizontal offset (e.g., along X axis) of the image pixel group 200 relative to the grid line 206 in the panel space has a value of 1 (e.g., X=1) indicating a one-pixel offset of the anchor pixel 202, with both the anchor pixel 202 and the center location 204 crossing the grid line 206. A diagram 216 illustrates that a horizontal offset (e.g., along X axis) of the image pixel group 200 relative to the grid line 206 in the panel space has a value of 2 (e.g., X=2) indicating a two-pixel offset of the anchor pixel 202, with both the anchor pixel 202 and the center location 204 crossing the grid line 206. The position of the center location 204 of the image pixel group 200 relative to the grid line 206 may be determined by using the location of the anchor pixel 202 based on the distribution of the image pixels (e.g., 2×2) in the image pixel group 200. For example, for the 2×2 image pixel group 200, when X=1, the center location 204 may have an offset of 3/2; and when X=2, the center location 204 may have an offset of 5/2. Although FIG. 11 illustrates the horizontal offsets of the image pixel group 200 relative to the grid lines of the of the optical crosstalk compensation (OXTC) factor map, vertical offsets of the image pixel group 200 may be determined similarly to the horizontal offsets.

Figure 12:
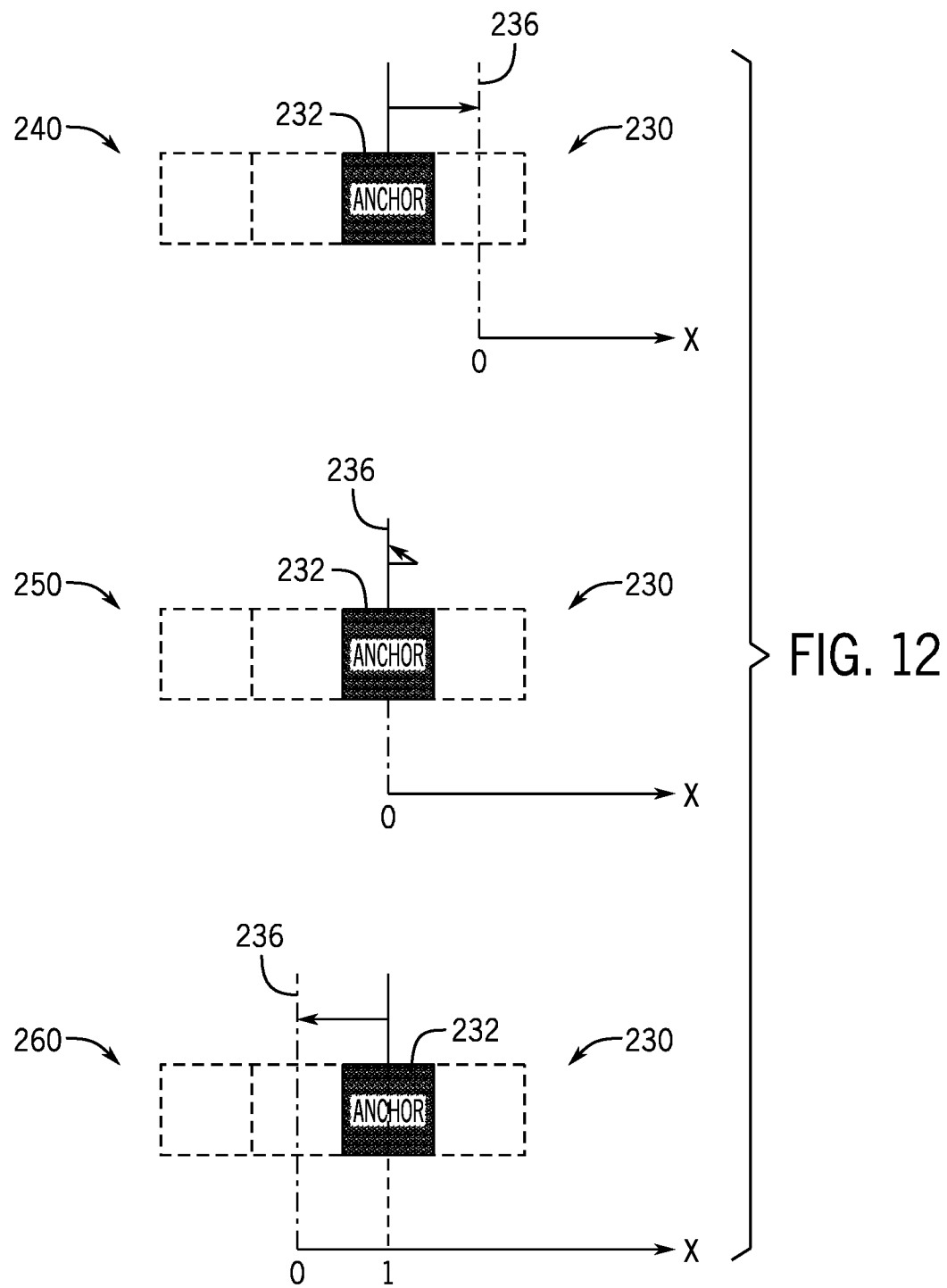
FIG. 12 is a block diagram of example offset values for a 1×1 pixel group, according to embodiments of the present disclosure.

FIG. 12 illustrates example offset values for an image pixel group 230 (e.g., 1×1 pixel group) including one pixel 232. Thus, the anchor pixel of the image pixel group 230 is overlapped with the pixel 232, and the center location of the image pixel group 230 is overlapped with the center location of the pixel 232. The offset values (e.g., horizontal offset, vertical offset) of the image pixel group 230 may be determined by using the location of the pixel 232 (e.g., the center of the pixel 232) relative to one or more grid lines of an optical crosstalk compensation (OXTC) factor map (e.g., the optical crosstalk compensation (OXTC) factor map 156B). A diagram 240 illustrates that a horizontal offset (e.g., along X axis) of the image pixel group 230 relative to the grid line 236 in the panel space has an unchanged value when no gird line crossing occurs (e.g., the pixel 232 may not cross the grid line 236). A diagram 250 illustrates that a horizontal offset (e.g., along X axis) of the image pixel group 230 relative to the grid line 236 in the panel space has a value of 0 (e.g., X=0) indicating a zero-pixel offset of the pixel 232. A diagram 260 that illustrates a horizontal offset (e.g., along X axis) of the image pixel group 230 relative to the grid line 236 in the panel space has a value of 1 (e.g., X=1) indicating a one-pixel offset of the pixel 232. Although FIG. 12 illustrates the horizontal offsets of the image pixel group 230 relative to the grid lines of the of the optical crosstalk compensation (OXTC) factor map, vertical offsets of the image pixel group 230 may be determined similarly to the horizontal offsets.

Figure 13:
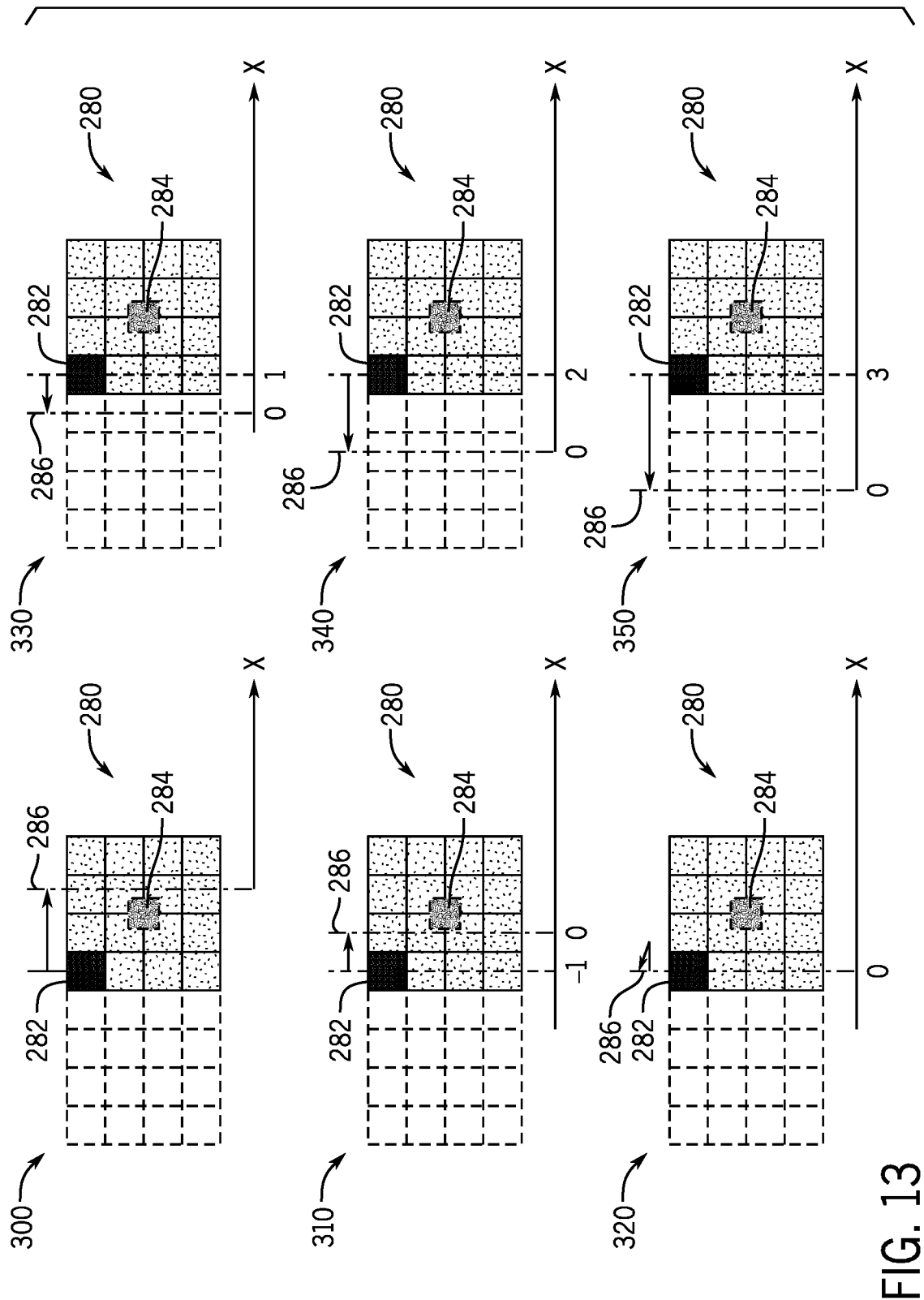
FIG. 13 is a block diagram of example offset values for a 4×4 pixel group, according to embodiments of the present disclosure.

FIG. 13 illustrates example offset values for an image pixel group 280 including 4×4 pixels. The image pixel group 280 may include an anchor pixel 282 located at the top left corner of the image pixel group 280 in the panel space. The image pixel group 280 may also include a center location 284 in the panel space. The offset values (e.g., horizontal offset, vertical offset) of the image pixel group 280 may be determined by using the location of the anchor pixel 282 (e.g., the center of the anchor pixel 282) relative to one or more grid lines of an optical crosstalk compensation (OXTC) factor map (e.g., the optical crosstalk compensation (OXTC) factor map 156B). The position of the center location 284 of the image pixel group 280 relative to the grid line 286 may be determined by using the location of the anchor pixel 282 based on the distribution of the image pixels (e.g., 4×4) in the image pixel group 280.

In FIG. 13, a diagram 300 illustrates that a horizontal offset (e.g., along X axis) of the image pixel group 280 relative to the grid line 286 in the panel space has an unchanged value when no gird line crossing occurs (e.g., both the anchor pixel 282 and the center location 284 may not cross the grid line 286). A diagram 310 illustrates that a horizontal offset (e.g., along X axis) of the image pixel group 280 relative to the grid line 286 in the panel space has a value of −1 (e.g., X=−1) indicating a negative one-pixel offset of the anchor pixel 282 with the center location 284 crossing the grid line 286. A diagram 320 illustrates a horizontal offset (e.g., along X axis) of the image pixel group 280 relative to the grid line 286 in the panel space has a value of 0 (e.g., X=0) indicating a zero-pixel offset of the anchor pixel 282 with the center location 284 crossing the grid line 286. A diagram 330 illustrates that a horizontal offset (e.g., along X axis) of the image pixel group 280 relative to the grid line 286 in the panel space has a value of 1 (e.g., X=1) indicating a one-pixel offset of the anchor pixel 282. In the diagram 330, both the anchor pixel 282 and the center location 284 cross the grid line 286. A diagram 340 illustrates that a horizontal offset (e.g., along X axis) of the image pixel group 280 relative to the grid line 286 in the panel space has a value of 2 (e.g., X=2) indicating a two-pixel offset of the anchor pixel 282. In the diagram 340, both the anchor pixel 282 and the center location 284 cross the grid line 286. A diagram 350 illustrates that a horizontal offset (e.g., along X axis) of the image pixel group 280 relative to the grid line 286 in the panel space has a value of 3 (e.g., X=3) indicating a three-pixel offset of the anchor pixel 282. In the diagram 350, both the anchor pixel 282 and the center location 284 cross the grid line 286. Although FIG. 13 illustrates the horizontal offsets of the image pixel group 280 relative to the grid lines of the of the optical crosstalk compensation (OXTC) factor map, vertical offsets of the image pixel group 280 may be determined similarly to the horizontal offsets.

Figure 14:
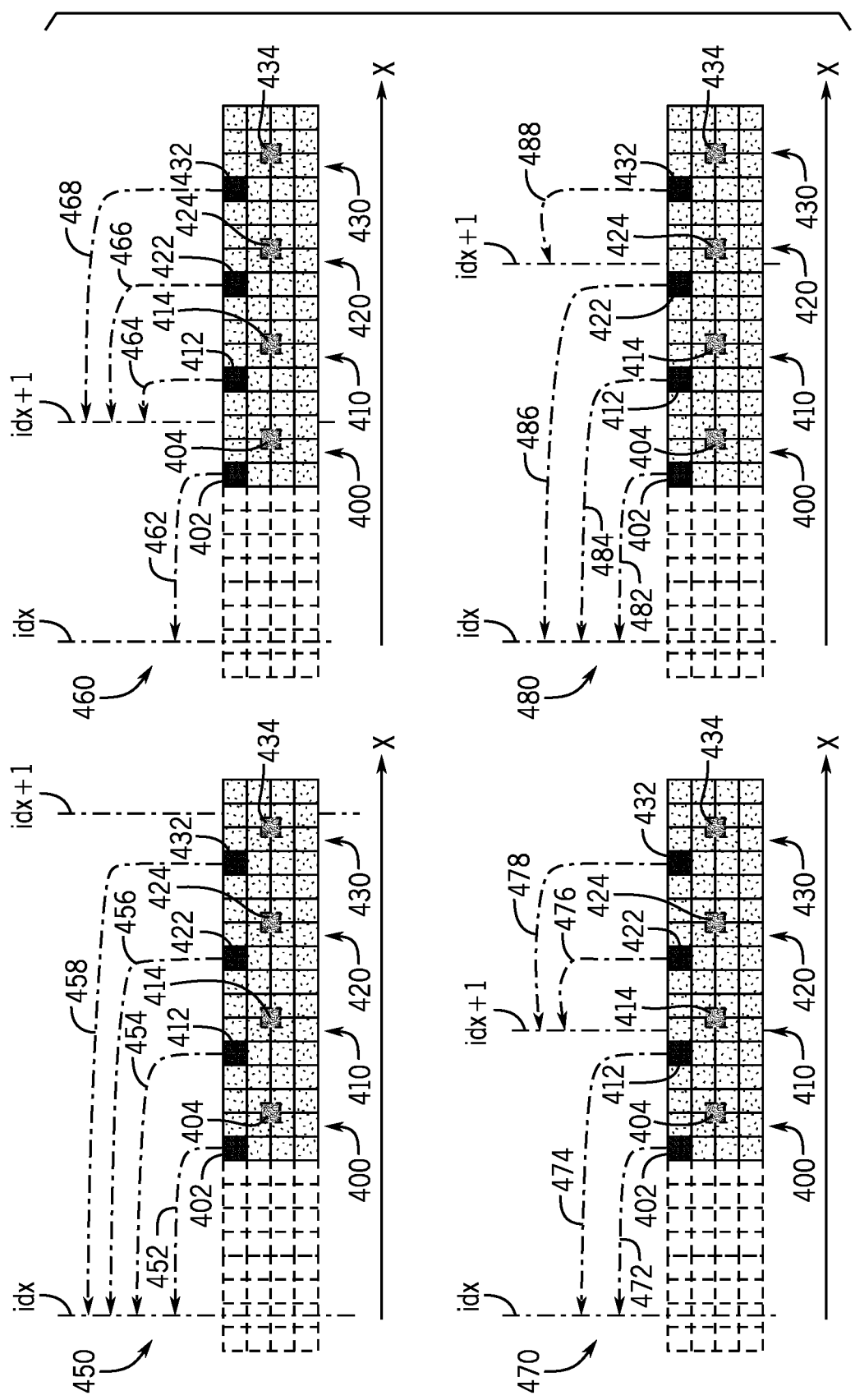
FIG. 14 is a block diagram of example offset values for multiple 4×4 pixel groups, according to embodiments of the present disclosure.

To improve processing efficiency, in some embodiments, the image processing circuitry 11 may process and update image data for several pixel groups in a parallel architecture, in which at least part of the optical crosstalk compensation (OXTC) may be calculated for several pixel groups simultaneously. FIG. 14 illustrates examples of offset values for four 4×4 pixel groups 400, 410, 420, and 430 relative to a first grid line idx and/or a second grid line idx+1 on an OXTC factor map. The image pixel group 400 may include an anchor pixel 402 located at the top left corner of the image pixel group 400 in the panel space. The image pixel group 400 may also include a center location 404 in the panel space. The image pixel group 410 may include an anchor pixel 412 located at the top left corner of the image pixel group 410 in the panel space. The image pixel group 410 may also include a center location 414 in the panel space. The image pixel group 420 may include an anchor pixel 422 located at the top left corner of the image pixel group 420 in the panel space. The image pixel group 420 may also include a center location 424 in the panel space. The image pixel group 430 may include an anchor pixel 432 located at the top left corner of the image pixel group 430 in the panel space. The image pixel group 430 may also include a center location 434 in the panel space. The four pixel groups may be next to each other, accordingly, the offset values of them are related to each other.

In FIG. 14, a diagram 450 illustrates an example when the image pixel groups 400, 410, 420, and 430 are located between the first grid line idx and the second grid line idx+1 with offset values relative to the first grid line idx as 452, 454, 456, and 458, respectively. In the diagram 450, the offset value 452 may be determined based on the location of the anchor pixel 402 relative to the first grid line idx; the offset value 454 may be determined based on the location of the anchor pixel 412 relative to the anchor pixel 402; the offset value 456 may be determined based on the location of the anchor pixel 422 relative to the anchor pixel 412; and the offset value 458 may be determined based on the location of the anchor pixel 432 relative to the anchor pixel 422.

In FIG. 14, a diagram 460 illustrates an example with the image pixel group 400 crossing the second grid line idx+1 and the image pixel groups 410, 420, and 430 not crossing the second grid line idx+1. Accordingly, the image pixel group 400 may have an offset value 462 relative to the first grid line idx, and the image pixel groups 410, 420, and 430 may have offset values 464, 466, and 468 relative to the second grid line idx+1, respectively. In the diagram 460, the offset value 462 may be determined based on the location of the anchor pixel 402 relative to the first grid line idx; the offset value 464 may be determined based on the location of the anchor pixel 412 relative to the second grid line idx+1; the offset value 466 may be determined based on the location of the anchor pixel 422 relative to the anchor pixel 412; and the offset value 468 may be determined based on the location of the anchor pixel 432 relative to the anchor pixel 422.

In FIG. 14, a diagram 470 illustrates an example with the image pixel groups 400 and 410 crossing the second grid line idx+1 and the image pixel groups 420 and 430 not crossing the second grid line idx+1. Accordingly, the image pixel groups 400 and 410 may have offset values 472 and 474 relative to the first grid line idx, respectively, and the image pixel groups 420 and 430 may have offset values 476 and 478 relative to the second grid line idx+1, respectively. In the diagram 470, the offset value 462 may be determined based on the location of the anchor pixel 402 relative to the first grid line idx; the offset value 474 may be determined based on the location of the anchor pixel 412 relative to the anchor pixel 402; the offset value 476 may be determined based on the location of the anchor pixel 422 relative to the second grid line idx+1; and the offset value 478 may be determined based on the location of the anchor pixel 432 relative to the anchor pixel 422.

In FIG. 14, a diagram 480 illustrates an example with the image pixel groups 400, 410, and 420 crossing the second grid line idx+1 and the image pixel group 430 not crossing the second grid line idx+1. Accordingly, the image pixel groups 400, 410, and 420 may have offset values 482, 484, and 486 relative to the first grid line idx, respectively, and the image pixel group 430 may have an offset value 488 relative to the second grid line idx+1. In the diagram 480, the offset value 482 may be determined based on the location of the anchor pixel 402 relative to the first grid line idx; the offset value 484 may be determined based on the location of the anchor pixel 412 relative to the anchor pixel 402; the offset value 486 may be determined based on the location of the anchor pixel 422 relative to the anchor pixel 412; and the offset value 488 may be determined based on the location of the anchor pixel 432 relative to the second grid line idx+1. Although horizontal offset values are used in FIG. 14, similar concept may be applied to the vertical offset values.

Figure 15:
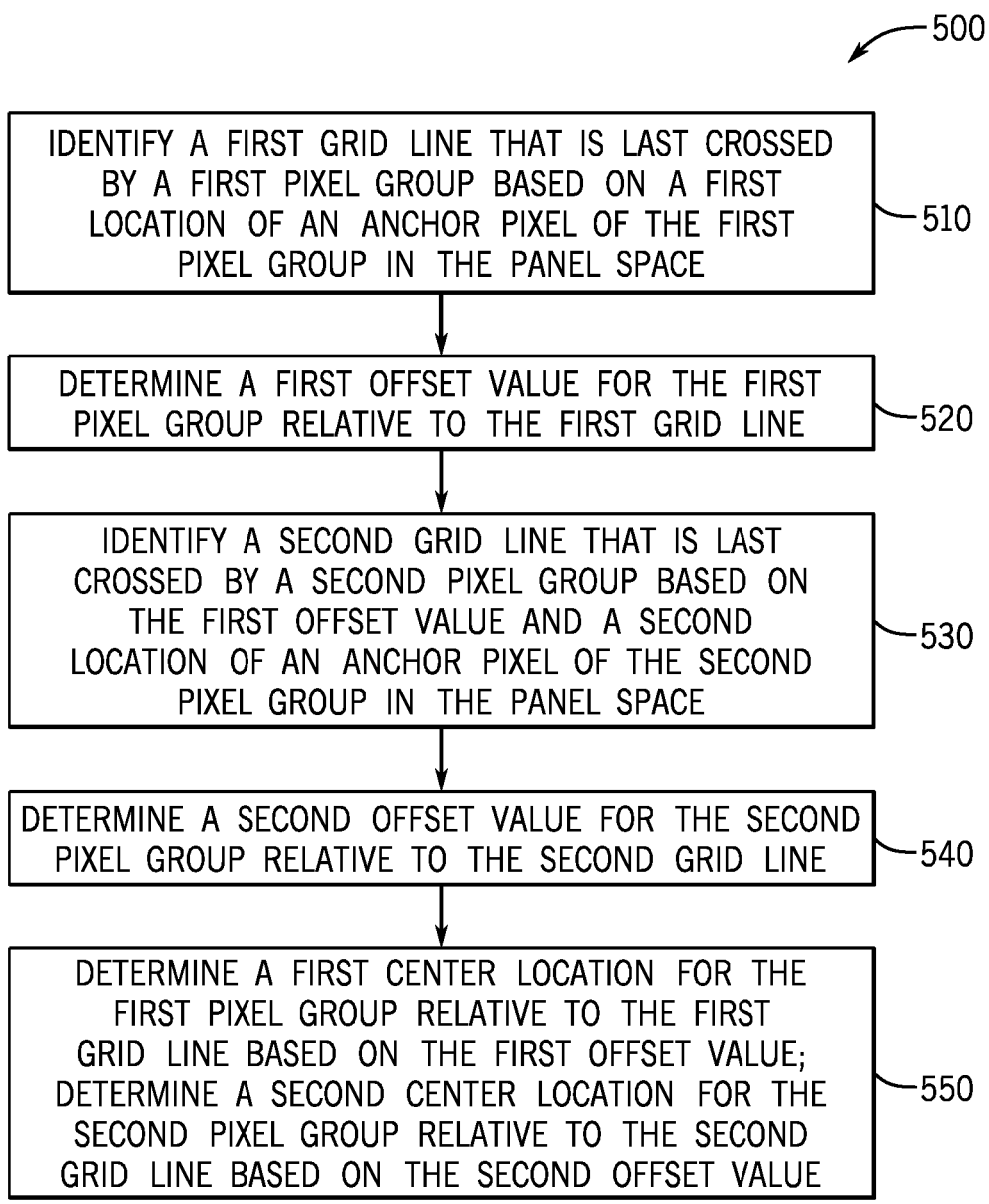
FIG. 15 is a block diagram of a method for calculating offset values used by the optical crosstalk compensation (OXTC) block of FIG. 7, according to embodiments of the present disclosure.

As described above, the offset values of multiple pixel groups may be related, thus the calculations of the offset values for one pixel group may depend on the calculations of the offset values for another pixel group. To implement the parallel architecture for calculating the optical crosstalk compensation (OXTC) more efficiently, a method 500 is illustrated in FIG. 15. At block 510, locations of grid lines (e.g., horizontal grid lines, vertical grid lines) on an OXTC factor map defined for the panel 38 may be compared with a first location of an anchor pixel of a first pixel group (e.g., a 1×1 pixel group, a 2×2 pixel group, a 4×4 pixel group) in the panel space, and a first grid line that is last crossed by the first pixel group may be identified. At block 520, a first offset value relative to the first grid line for the first pixel group may be determined based on the location of the first grid line and the first location of the anchor pixel of the first pixel group in the panel space. Since a second location of an anchor pixel of a second pixel group is related to the first location of the anchor pixel of the first pixel group, a second grid line that is last crossed by a second pixel group may be identified based on the first offset value and the second location of the anchor pixel of the second pixel group at block 530. At block 540, a second offset value relative to the second grid line for the second pixel group may be determined based on the location of the second grid line and the second location of the anchor pixel of the second pixel group in the panel space. The offset values for additional pixel groups may be determined similarly. At block 550, a first center location for the first pixel group relative to the first grid line may be determined based on the first offset value, and a second center location for the second pixel group relative to the second grid line may be determined based on the second offset value. Since the center locations for the image pixel groups may be determined independently for different pixel groups, block 550 may include center location calculations for multiple pixel groups processed in a parallel architecture. Thus, by using method 500 described in FIG. 15, the image processing circuitry 11 may process and update image data for several pixel groups in a parallel architecture, in which at least part of the optical crosstalk compensation (OXTC) may be calculated for several pixel groups simultaneously. Although two pixel groups are described in the method 500, the method 500 may be used for pixel groups more than two.

To improve processing efficiency and improving perceived image quality, an active region may be defined as the portion of image frame that may be processed by the OXTC block 154. For example, the active region may be associated with the gaze location of the eyes of the viewer, which may change dynamically on the display panel 38 and is related to the viewing angle of a viewer. To improve processing efficiency, the image data associated with any pixel that lies outside the active region may be copied directly from the input of the OXTC block 154 to the output of the OXTC block 154 without processing. Inside the active region, the weight of the OXTC may also be distributed based on distance relative to the center of the gaze location, as illustrated in FIG. 16.

Figure 16:
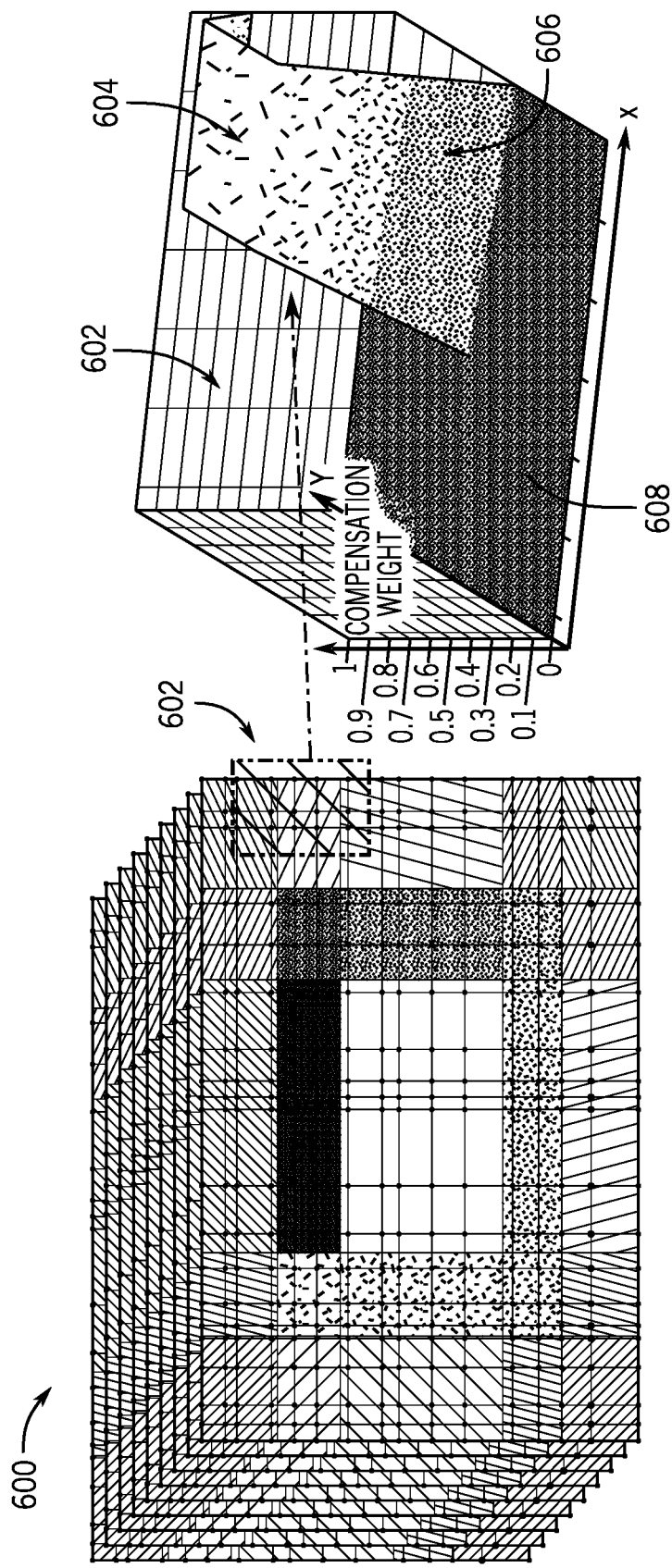
FIG. 16 is a diagrammatic representation of an image frame with an active area for calculating compensation weights used by the optical crosstalk compensation (OXTC) block of FIG. 7, according to embodiments of the present disclosure.

FIG. 16 illustrate an image frame 600 with an active region 602 indicated. The FIG. 16 also illustrates nine 16×20 optical crosstalk compensation (OXTC) 2D grids corresponding to nine optical crosstalk compensation factors (e.g., $F_R$, $F_{R2G}$, $F_{R2B}$, $F_{G2R}$, $F_G$, $F_{G2B}$, $F_{B2R}$, $F_{B2G}$, $F_B$) for the panel 38. Similar as in FIG. 10, the frame 600 may include foveation regions with a gaze location in the central foveation region. As mention previously, a change in viewing angle may move the gaze location on the display panel 38, which may result in the gaze location being shifted into the active region 602 on the image frame 600. As illustrated in FIG. 16, at a center 604 of the gaze location, the compensation weight may have the maximum value (e.g., 1) in the active region 602, indicating that the OXTC is utilized at full strength. At a location 606 with a distance (e.g., on XY plane of the panel 38) away from the center 604, the compensation weight may have a value less than the maximum value (e.g., less than 1), which is related to the distance between the center 604 and the location 606. For example, the further away the location 606 is from the center 604 (e.g., when the distance between the center 604 and the location 606 is bigger), the smaller value the compensation weight may have at the location 606, indicating the strength of the OXTC is reduced as the location 606 moves away from the center 604. For example, at a location 608, the strength of the OXTC may be reduced to zero. Similarly, the closer the location 606 is to the center 604 (e.g., when the distance between the center 604 and the location 606 is smaller), the bigger value the compensation weight may have at the location 606, indicating the strength of the OXTC is increased as the location 606 moves closer to the center 604. The OXTC weights may be used to determine a weighted optical crosstalk compensation factor map, which may be used with the input image data of the OXTC block 154 to obtain the output image data of the OXTC block 154.

Figure 17:
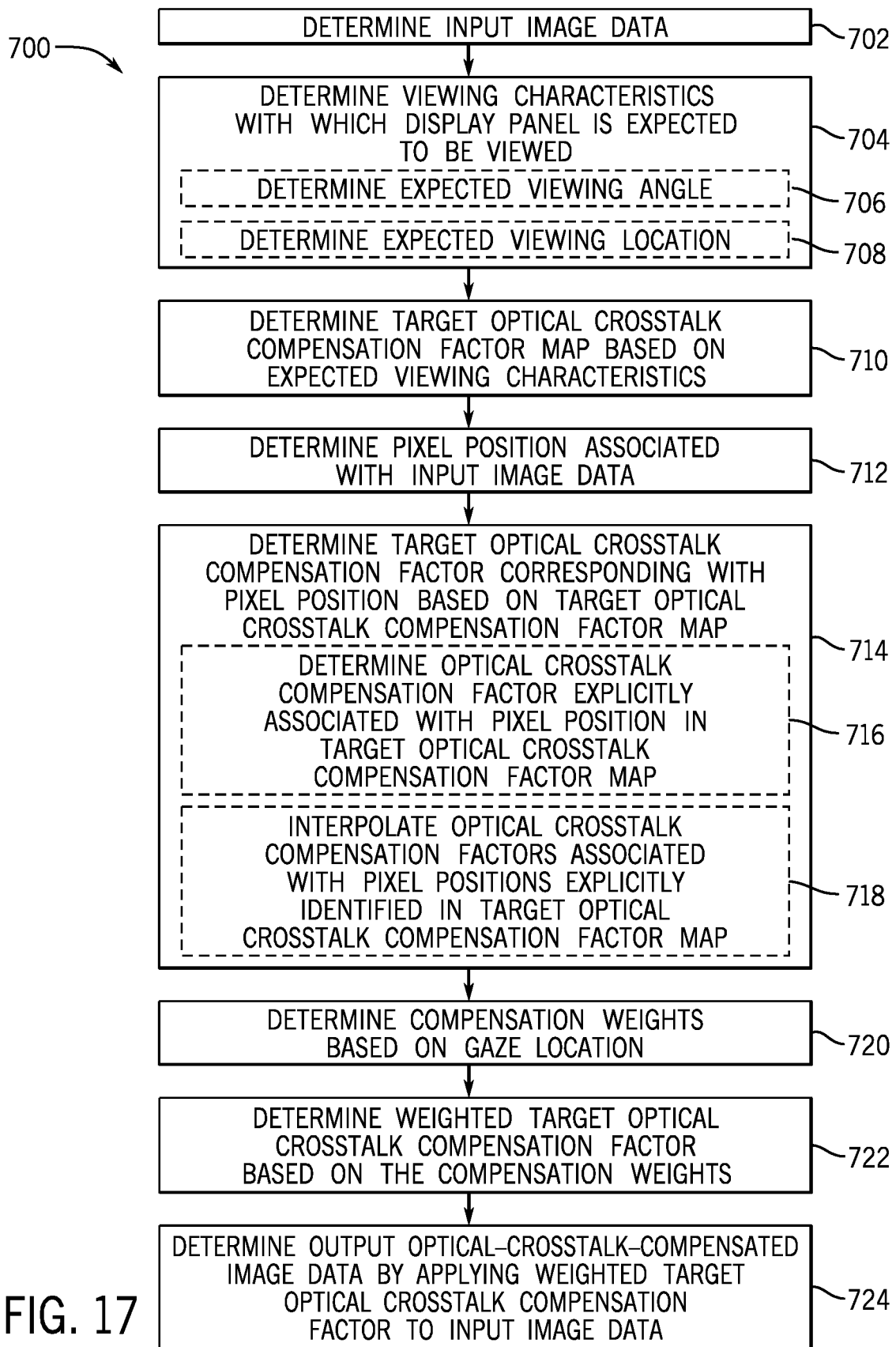
FIG. 17 is a block diagram of an example process for operating the optical crosstalk compensation (OXTC) block of FIG. 7, according to embodiments of the present disclosure.

To help further illustrate, an example of a process 700 for operating an optical crosstalk compensation block (e.g., circuitry group) 154, which may be implemented in image processing circuitry 11 of an electronic device 10, is described in FIG. 17. Generally, the process 700 may include determining input image data (process block 702), determining viewing characteristics with which a display panel is expected to be viewed (process block 704), which includes determining an expected viewing angle (process block 706) and determining an expected viewing location (process block 708). The process 700 may also include determining a target optical crosstalk compensation factor map based on the expected viewing characteristics (process block 710). Additionally, the process 700 may include determining a pixel position associated with the input image data (process block 712). The process 700 may also include determining a target optical crosstalk compensation factor corresponding with the pixel position based on the target optical crosstalk compensation factor map (process block 714), which includes determining an optical crosstalk compensation factor explicitly associated with pixel positions identified in the target optical crosstalk compensation factor map (process block 716) and interpolating optical crosstalk compensation factors associated with pixel positions explicitly identified in the target optical crosstalk compensation factor map (process block 718) to obtain the target optical crosstalk compensation factor. The process 700 may also include determining compensation weights based on a gaze location (e.g., detected by the eye tracker 28) (process block 720). The process 700 may also include determining weighted target optical crosstalk compensation factor map based on the compensation weights (process block 722). The process 700 may also include determining output optical-crosstalk-compensated image data by applying the target optical crosstalk compensation factor to the input image data (process block 724).

Although described in a particular order, which represents a particular embodiment, it should be noted that the process 700 may be performed in any suitable order. Additionally, embodiments of the process 700 may omit process blocks and/or include additional process blocks. Moreover, in some embodiments, the process 700 may be implemented at least in part by circuit connections formed (e.g., programmed) in image processing circuitry 11. Additionally or alternatively, the process 700 may be implemented at least in part by executing instructions stored in a tangible, non-transitory, computer-readable medium, such as controller memory 140, using processing circuitry, such as a controller processor 138.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:
   an electronic display configured to display static or dynamic image data; and
   optical crosstalk compensation circuitry configured to generate optical crosstalk compensated image data of an input image frame, wherein the optical crosstalk compensated image data is compensated for optical crosstalk generated among a plurality of color components of input image data of the input image frame at least in part by:
      determining one or more two-dimensional optical crosstalk compensation factor maps based on one or more viewing characteristics, wherein each of the one or more two-dimensional optical crosstalk compensation factor maps comprises respective optical crosstalk compensation factors for the electronic display;
      using the one or more two-dimensional optical crosstalk compensation factor maps to obtain compensation factors for the input image data;
      calculating compensation weight data for the input image data based on one or more of the viewing characteristics; and
      generating the optical crosstalk compensated image data based at least in part on the calculated compensation weight data.

2. The electronic device of claim 1, wherein the calculated compensation weight data are applied to the compensation factors to obtain weighted compensation factors, which are applied to the input image data to generate the optical crosstalk compensated image data.

3. The electronic device of claim 1, wherein one of the viewing characteristics comprises a viewing angle.

4. The electronic device of claim 1, wherein one or more of the viewing characteristics are detected by an eye tracker of the electronic device.

5. The electronic device of claim 4, wherein the viewing characteristics are detected by the eye tracker of the electronic device on a per-frame basis.

6. The electronic device of claim 1, wherein the one or more two-dimensional optical crosstalk compensation factor maps comprise one or more of: a red optical crosstalk compensation factor map, a red-to-green optical crosstalk compensation factor map, a red-to-blue optical crosstalk compensation factor map, a green-to-red optical crosstalk compensation factor map, a green optical crosstalk compensation factor map, a green-to-blue optical crosstalk compensation factor map, a blue-to-red optical crosstalk compensation factor map, a blue-to-green optical crosstalk compensation factor map, and a blue optical crosstalk compensation factor map.

7. The electronic device of claim 1, wherein the compensation factors are determined on a per-frame basis.

8. The electronic device of claim 1, wherein one of the viewing characteristics comprises a gaze location, and wherein the electronic display comprises a plurality of display pixels to display the optical crosstalk compensated image data, and wherein each of the plurality of display pixels has a respective distance to a center of the gaze location, and the compensation weight data are associated with distances of corresponding display pixels to the center of the gaze location.

9. The electronic device of claim 8, wherein the compensation weight data comprise a maximum value for the optical crosstalk compensated image data displayed at the center of the gaze location on the electronic display.

10. The electronic device of claim 8, wherein the compensation weight data comprise a zero value for the optical crosstalk compensated image data displayed at a distance greater than a predefined distance to the center of the gaze location.

11. A method to generate optical crosstalk compensated image data for input image data displayed on an electronic display, the method comprising:
  determining a two-dimensional optical crosstalk compensation factor map based on viewing characteristics of the electronic display, wherein the two-dimensional optical crosstalk compensation factor map comprise a two-dimensional grid formed by a plurality of grid lines, and wherein the two-dimensional grid comprises a plurality of compensation factors;
  determining respective offset value for each of a plurality of image pixel groups of the input image data based on a respective offset between a respective location in each of the plurality of image pixel groups and the plurality of grid lines;
  interpolating compensation factors in the two-dimensional optical crosstalk compensation factor map to obtain corresponding interpolated compensation factors for the plurality of image pixel groups by using the respective offset values; and
  generating the optical crosstalk compensated image data by applying the interpolated compensation factors to the input image data.

12. The method of claim 11, wherein respective locations of the plurality of image pixel groups are changed relative to the plurality of grid lines based on a change of a gaze location on the electronic display.

13. The method of claim 11, wherein the respective location in each of the plurality of image pixel groups comprises a respective image pixel in each of the plurality of image pixel groups.

14. The method of claim 13, wherein the respective location in each of the plurality of image pixel groups comprises a respective position located at a particular distance from the respective image pixel.

15. The method of claim 14, further comprising:
  determining a first pixel offset value relative to a first grid line of the plurality of grid lines for a first image pixel in a first image pixel group of the plurality of image pixel groups based on a location of the first image pixel and a location of the first grid line;
  determining a second pixel offset value relative to a second grid line of the plurality of grid lines for a second image pixel in a second image pixel group of the plurality of image pixel groups based on the first pixel offset value, wherein the second image pixel is located at a predefined distance from the first image pixel;
  determining a first location offset value relative to the first grid line of the plurality of grid lines for a first location in the first image pixel group of the plurality of image pixel groups based on the first pixel offset value;
  determining a second location offset value relative to the second grid line of the plurality of grid lines for a second location in the second image pixel group of the plurality of image pixel groups based on the second pixel offset value;
  determining a first offset value for the first image pixel group based on the first pixel offset value and the first location offset value; and
  determining a second offset value for the first image pixel group based on the second pixel offset value and the second location offset value.

16. The method of claim 15, wherein the first location offset value and the second location offset value are determined simultaneously.

17. The method of claim 15, wherein the first grid line is crossed by the first image pixel.

18. The method of claim 17, wherein the second grid line is crossed by the second image pixel.

19. The method of claim 18, wherein the first grid line is not crossed by the second image pixel.

20. An electronic device comprising:
  an electronic display comprising a plurality of pixels to display an image frame, wherein optical crosstalk compensated image data are configured to compensate for optical crosstalk generated among a plurality of color components of input image data of the image frame on the electronic device, wherein the image frame is divided into a plurality of adjustable regions each having respective resolution of a plurality of resolutions; and
  image processing circuitry configured to generate the optical crosstalk compensated image data for the image frame in the plurality of adjustable regions, and respective optical crosstalk compensated image data in each of the plurality of adjustable regions are generated by:
    determining one or more two-dimensional optical crosstalk compensation factor maps based on one or more viewing characteristics, wherein each of the one or more two-dimensional optical crosstalk compensation factor maps comprise respective optical crosstalk compensation factors for the electronic display;
    using the one or more two-dimensional optical crosstalk compensation factor maps to obtain compensation factors for the image data in respective region of the plurality of adjustable regions; and
    generating the respective optical crosstalk compensated image data by applying the compensation factors for the image data in the respective region of the plurality of adjustable regions.

\* \* \* \* \*